United States Patent
Kang et al.

(10) Patent No.: US 10,985,364 B2
(45) Date of Patent: Apr. 20, 2021

(54) PLIABLE CARBONACEOUS POCKET COMPOSITE STRUCTURE, METHOD FOR PREPARING THE SAME, ELECTRODE, INCLUDING THE SAME, AND ENERGY STORAGE DEVICE INCLUDING THE ELECTRODE

(71) Applicant: KOREA ADVANCED INSTITUTE OF SCIENCE AND TECHNOLOGY, Daejeon (KR)

(72) Inventors: Jeung Ku Kang, Daejeon (KR); Jong Ho Won, Daejeon (KR); Hyung Mo Jeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 337 days.

(21) Appl. No.: 15/937,914

(22) Filed: Mar. 28, 2018

(65) Prior Publication Data

US 2018/0248181 A1 Aug. 30, 2018

Related U.S. Application Data

(63) Continuation of application No. PCT/KR2018/000605, filed on Jan. 12, 2018.

(30) Foreign Application Priority Data

Feb. 28, 2017 (KR) .................. 10-2017-0026777
Apr. 19, 2017 (KR) .................. 10-2017-0050697
Aug. 31, 2017 (KR) .................. 10-2017-0111350

(51) Int. Cl.
  *H01M 4/00* (2006.01)
  *H01M 4/36* (2006.01)
  (Continued)

(52) U.S. Cl.
  CPC ............ *H01M 4/366* (2013.01); *H01G 11/32* (2013.01); *H01G 11/50* (2013.01); *H01G 11/86* (2013.01);
  (Continued)

(58) Field of Classification Search
  CPC .. G06F 13/1668; G06F 13/1642; G06F 13/16; G06F 13/42; H01M 4/366; H01M 4/386; H01M 10/0525; H01M 12/005
  See application file for complete search history.

(56) References Cited

U.S. PATENT DOCUMENTS

2011/0111303 A1   5/2011   Kung et al.
2012/0058397 A1   3/2012   Zhamu et al.
                  (Continued)

FOREIGN PATENT DOCUMENTS

CN   106207155 A   12/2016
JP   2012064571 A   3/2012
              (Continued)

OTHER PUBLICATIONS

International Search Report issued in PCT/KR2018/000605, dated Apr. 16, 2018.
(Continued)

*Primary Examiner* — Cynthia H Kelly
*Assistant Examiner* — Monique M Wills
(74) *Attorney, Agent, or Firm* — Hamre, Schumann, Mueller & Larson, P.C.

(57) ABSTRACT

The present disclosure relates to a pliable carbonaceous pocket composite structure including various particles encapsulated within pliable carbonaceous pockets formed by carbonaceous sheets, a method for preparing the pliable carbonaceous pocket composite structure which enables ultrafast mass production of the pliable carbonaceous pocket composite structure, an electrode including the pliable car-
(Continued)

bonaceous pocket composite structure, and an energy storage device including the electrode.

41 Claims, 26 Drawing Sheets

(51) Int. Cl.
*H01M 4/38* (2006.01)
*H01M 4/587* (2010.01)
*H01M 10/0525* (2010.01)
*H01M 12/00* (2006.01)
*H01G 11/50* (2013.01)
*H01G 11/86* (2013.01)
*H01G 11/32* (2013.01)
*H01G 11/74* (2013.01)
*H01M 4/02* (2006.01)
*H01G 11/42* (2013.01)

(52) U.S. Cl.
CPC .......... *H01M 4/386* (2013.01); *H01M 4/587* (2013.01); *H01M 10/0525* (2013.01); *H01M 12/005* (2013.01); *H01G 11/42* (2013.01); *H01G 11/74* (2013.01); *H01M 2004/028* (2013.01); *H01M 2300/004* (2013.01); *Y02E 60/10* (2013.01); *Y02T 10/70* (2013.01)

(56) References Cited

U.S. PATENT DOCUMENTS

| | | | |
|---|---|---|---|
| 2012/0064409 | A1 | 3/2012 | Zhamu et al. |
| 2012/0321953 | A1 | 12/2012 | Chen et al. |
| 2013/0344392 | A1 | 12/2013 | Huang et al. |
| 2015/0044556 | A1 | 2/2015 | Wang et al. |
| 2017/0047584 | A1 | 2/2017 | Hwang et al. |
| 2019/0044143 | A1* | 2/2019 | Joo ........................ H01M 4/139 |

FOREIGN PATENT DOCUMENTS

| | | |
|---|---|---|
| KR | 1020110053012 A | 5/2011 |
| KR | 1020130111697 A | 10/2013 |
| KR | 1020140082965 A | 7/2014 |
| KR | 1020140082994 A | 7/2014 |
| KR | 1020140105668 A | 9/2014 |
| KR | 1020150128592 A | 11/2015 |

OTHER PUBLICATIONS

Li et al., "Novel Pyrolyzed Polyaniline-Grafted Silicon Nanoparticles Encapsulated in Graphene Sheets As Li-Ion Battery Anodes", ACS Applied Materials & Interfaces, Apr. 4, 2014, vol. 6, pp. 5996-6002, Cited in Office Action issued in corresponding Japanese Application 2018516477.

The extended European search report issued in European Patent Application No. 18760706.4, dated Jun. 19, 2020, 9 pages provided.

* cited by examiner

*FIG. 1C*
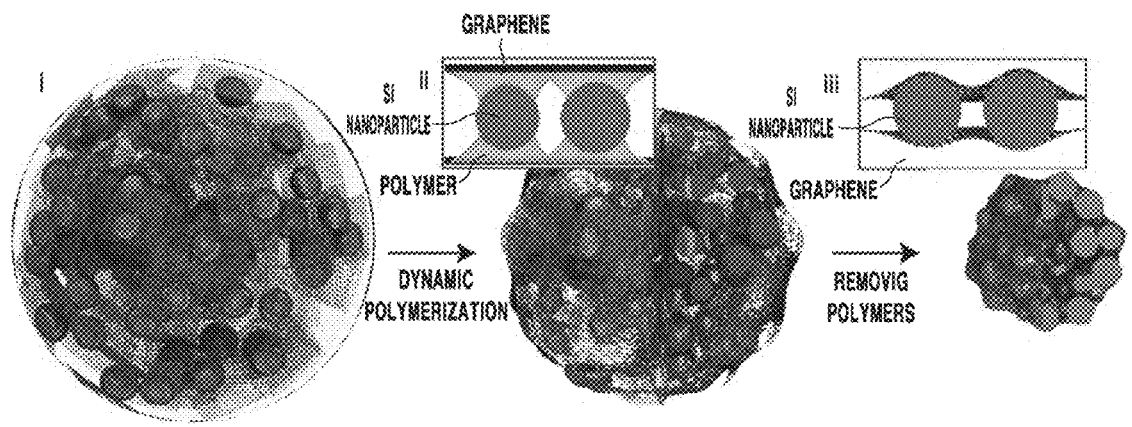
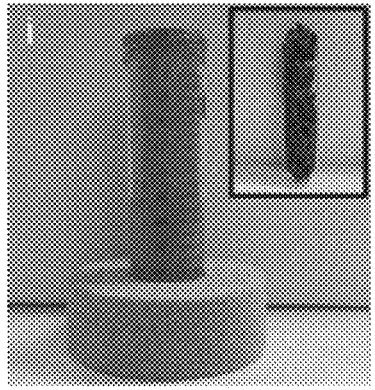
*FIG. 1D(i)*
50 mL SCALE BATCH
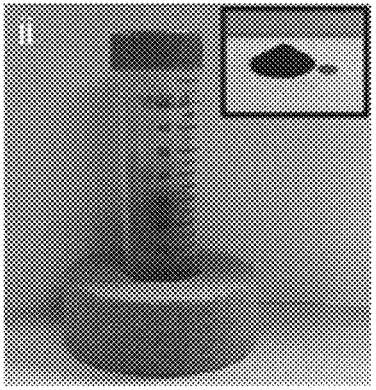
*FIG. 1D(ii)*
50 mL SCALE BATCH
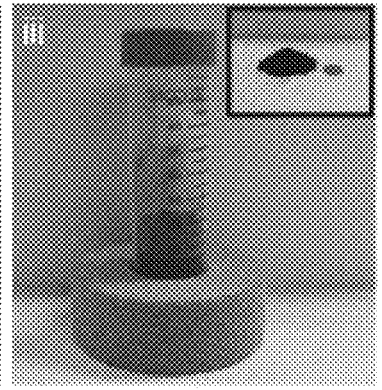
*FIG. 1D(iii)*
50 mL SCALE BATCH

*FIG. 1E(i)*  
500 mL SCALE BATCH
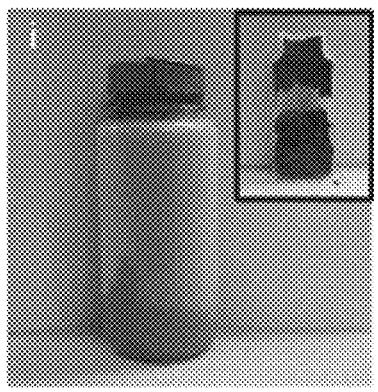
*FIG. 1E(ii)*  
500 mL SCALE BATCH
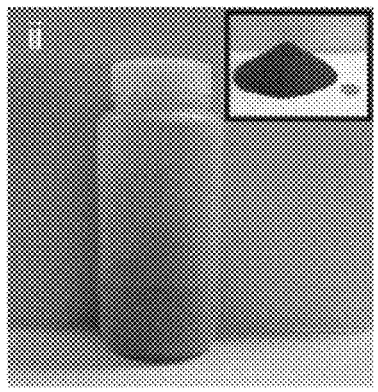
*FIG. 1E(iii)*  
500 mL SCALE BATCH
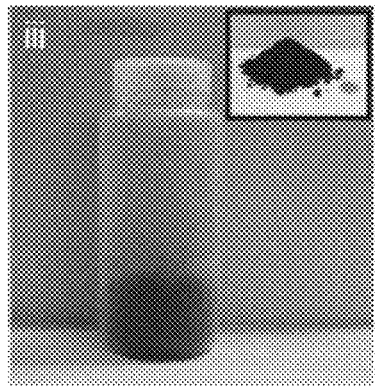
*FIG. 1F*
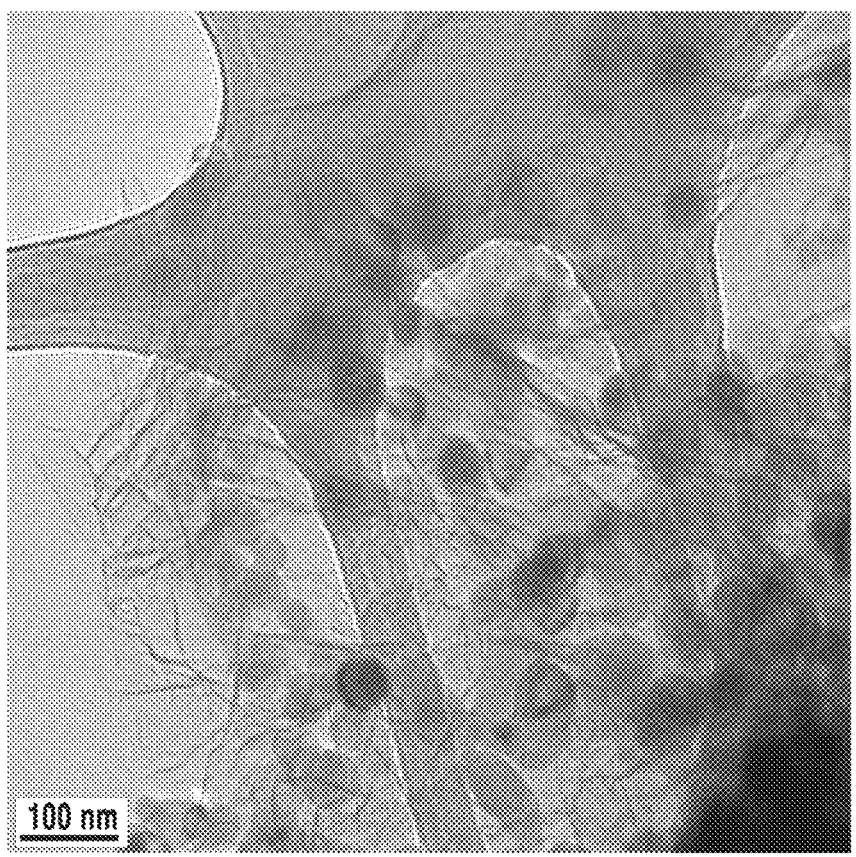

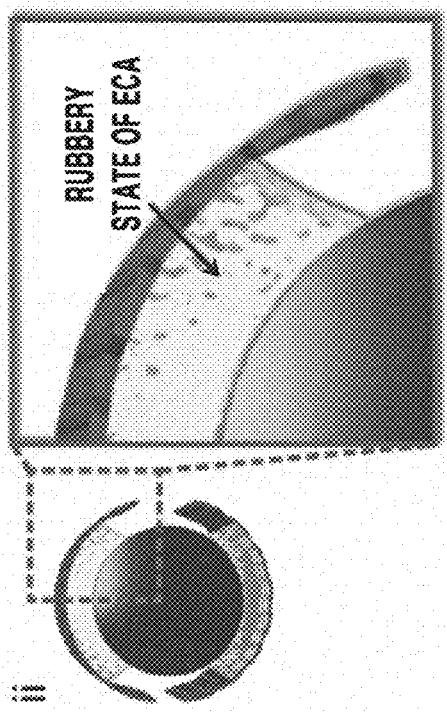
FIG. 2C(i)
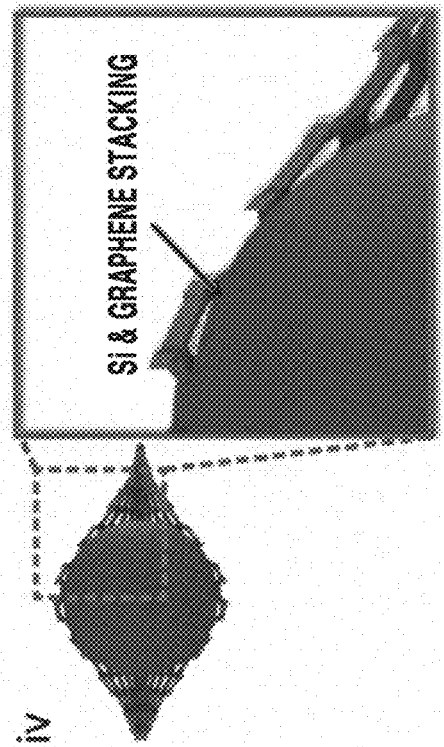
FIG. 2C(ii)
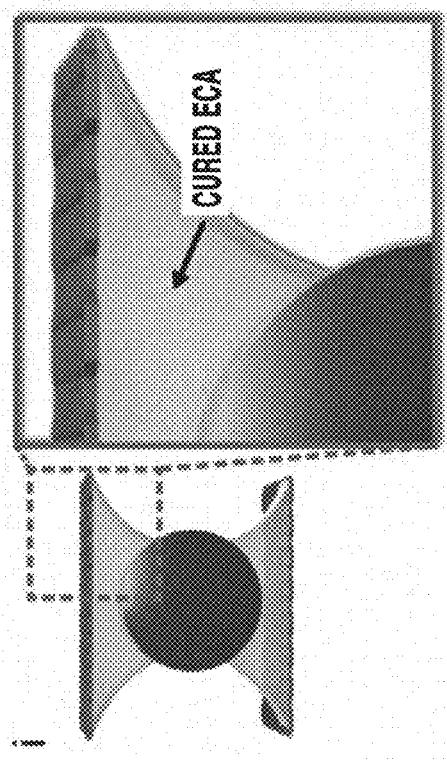
FIG. 2C(iii)
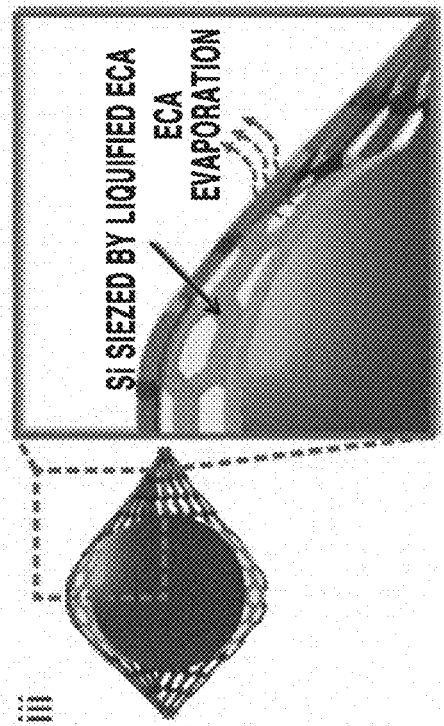
FIG. 2C(iv)

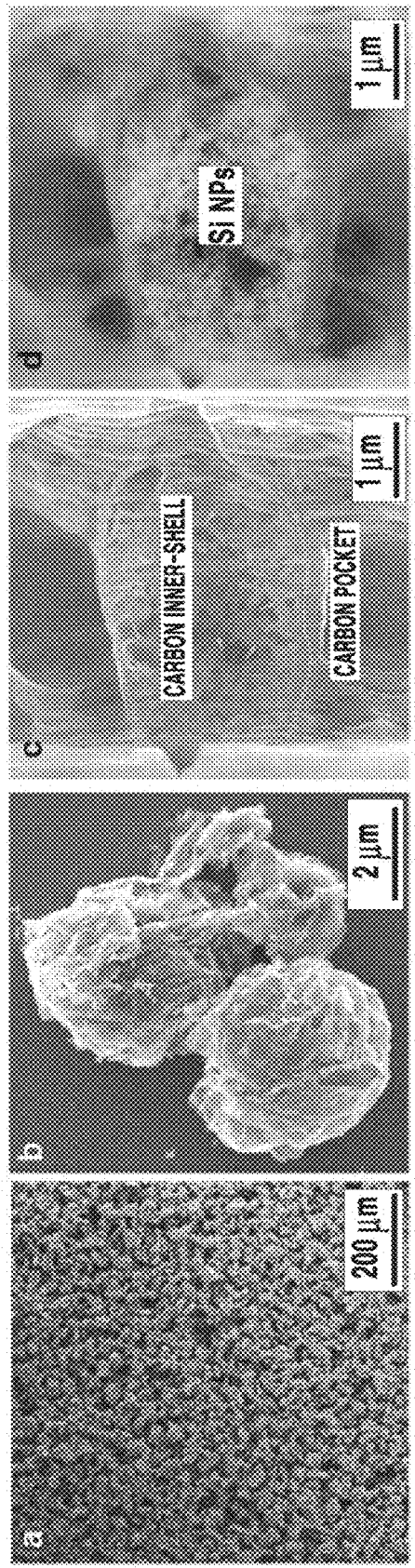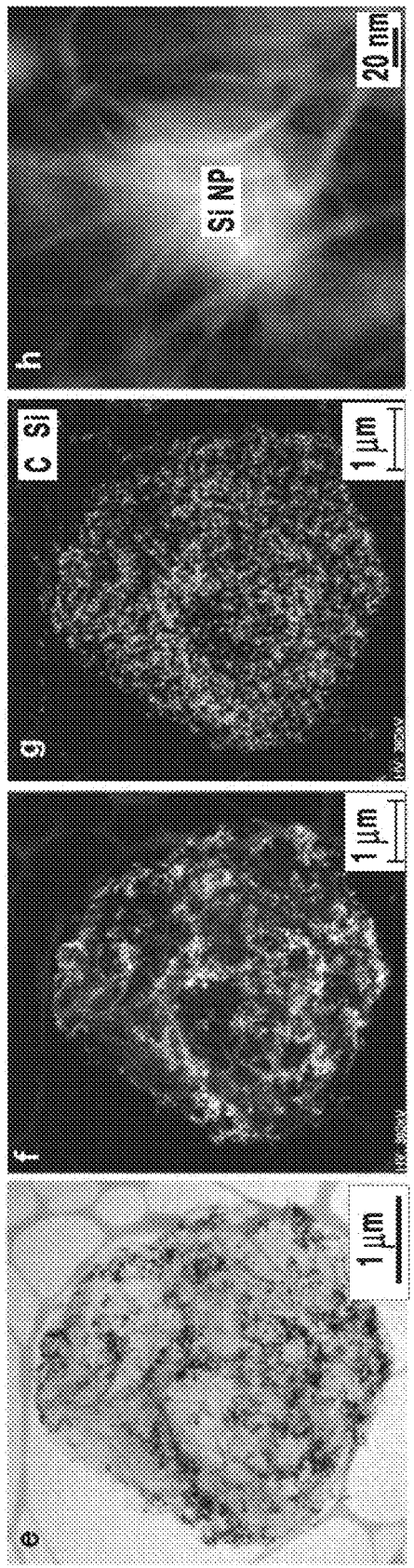

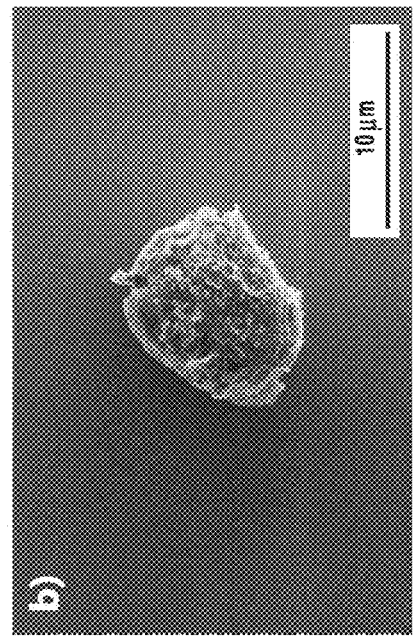
FIG. 8A
FIG. 8B
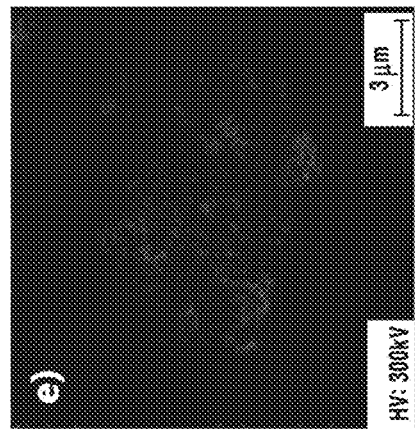
FIG. 8C
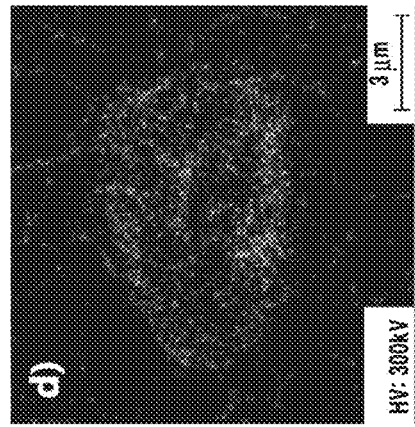
FIG. 8D
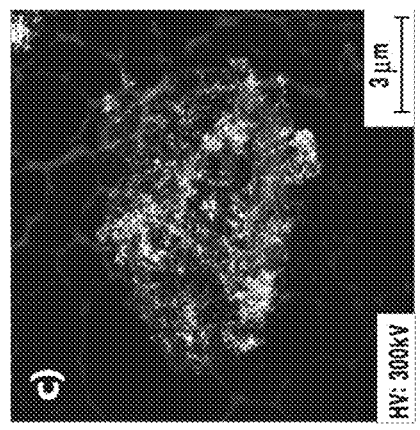
FIG. 8E

PLIABLE CARBONACEOUS POCKET COMPOSITE STRUCTURE, METHOD FOR PREPARING THE SAME, ELECTRODE, INCLUDING THE SAME, AND ENERGY STORAGE DEVICE INCLUDING THE ELECTRODE

CROSS-REFERENCE TO RELATED APPLICATIONS

This application is a continuation of PCT Application No. PCT/KR2018/000605, filed on Jan. 12, 2018, which claims priority to Korean Patent Application No. 10-2017-0026777 filed on Feb. 28, 2017, Korean Patent Application No. 10-2017-0050697 filed on Apr. 19, 2017, and Korean Patent Application No. 10-2017-0111350 filed on Aug. 31, 2017, all of which are hereby incorporated by reference in their entirety.

TECHNICAL FIELD

The present disclosure relates to a pliable carbonaceous pocket composite structure including various particles encapsulated within pliable carbonaceous pockets formed by carbonaceous sheets, a method for preparing the pliable carbonaceous pocket composite structure, an electrode including the pliable carbonaceous pocket composite structure, and an energy storage device including the electrode.

BACKGROUND

As demand for energy storage devices with higher energy densities is exploding over time, enormous attention has been toward lithium ion batteries (LIB). However, ever-evolving variety systems require higher levels of energy storage, and the improvement of the anode materials of LIBs is especially required to satisfy this demand.

In spite of the numerous studies to improve anode materials, the performance of LIB used in real life is still stagnant. By these problems, the lithium metal batteries are emerging, which ultimately reduces the specific gravity of the anode material by replacing graphite currently used as an anode material of a LIB. Although this methodology shows a possibility to achieve a very high energy density, the safety problem has not been solved.

By these reasons, it is essential that the new approach for developing an anode having a high specific capacity bridge the gap between conventional and Li-metal batteries. Moreover, the whole process for preparing the anode materials have to not only be scalable and precisely controllable for further process to commercialization, but also be capable of paring with representative cathode materials for practical full-cell devices. More importantly, the newly suggested methodology for designing materials should be able to apply directly to the current industrial structure, and capable of being realized in near future.

Extensive growth of the demand to increase the energy density of lithium ion batteries (LIBs) for advanced portable electronic devices and electric vehicles (EVs) have aroused the enormous interests in the new anode materials. Various transition series of metal oxide or IV series species with high theoretical capacities over 1000 mAh/g have been expected to play a key role in realizing the next generation LIBs with high energy densities, increasing the specific gravimetric capacities on the anode sides. Despite of this attractive feature, the severe capacity fading by their huge volume expansion introducing the unstable solid-electrolyte interphase (SEI) layer formation in a repeated cycling operation hinders their practical applications. Moreover, relatively low electrical properties in high performances electrodes such as conductivity and Li ion diffusivity can be also the obstacle limiting the role as an anode in a full-cell configuration. Various approaches to address the issues in these anode materials have been developed, such as the diminishing the size of active materials, formation of buffer layers on active materials by removing the surface inactive shell, and composition with carbon materials. However, these suggestions are still suffering from the increasing the irreversible reaction for SEI formation, lack of cost-efficiency in scalable process, and low-contents of active materials in a total electrode.

Of the possible candidate for anode materials, silicon (Si), which has a high theoretical capacity over 3,500 mAh/g, has been considered as the most promising candidate for replacing the graphite (372 mAh/g). Almost 10 times higher specific capacity of Si anodes than that of graphite can be leading a reduced weight of anode side, extracting the maximized energy densities from the full-cell configuration of LIBs. Unfortunately, the issues raised from the volume change during the operation are the most magnified in the Si-based materials. To use Si as an anode, an advanced nanomaterial design for Si-carbon composites has been suggested to prevent a volume expansion and control SEI formation for high Coulombic efficiency (CE), such as Si nanotubes, Si-carbon core shell, and graphene encapsulated Si clusters. However, these Si composites still suffer from insufficient active materials contents in composites, limiting the specific capacity for high energy densities in full-cells and consuming the Li ions during a first cycle by less 85% of initial CE (ICE). Moreover, the synthesis procedures for fabricating the structures precisely, such as the HF etching process, gas-phase synthesis with high-temperature, and hard-template operation, are quite far from the practical application because of various aspects of inefficiency in cost, safety, and scalability.

PRIOR ART DOCUMENTS

Korean Patent Laid-open Publication No. 2013-0111697;
A. S. Arico, P. Bruce, B. Scrosati, J.-M. Tarascon and W. van Schalkwijk, *Nat Mater*, 2005, 4, 366-377

DISCLOSURE OF THE INVENTION

Problems to be Solved by the Invention

The present disclosure provides a pliable carbonaceous pocket composite structure including various particles encapsulated within pliable carbonaceous pockets formed by carbonaceous sheets, a method for preparing the pliable carbonaceous pocket composite structure, an electrode including the pliable carbonaceous pocket composite structure, and an energy storage device including the electrode.

However, problems to be solved by the present disclosure are not limited to the above-described problems. Although not described herein, other problems to be solved by the present disclosure can be clearly understood by those skilled in the art from the following description.

Means for Solving the Problems

A first aspect of the present disclosure provides a pliable carbonaceous pocket composite structure including a composite which includes one or more particles, each of the particles being encapsulated by each of one or more first carbonaceous pockets formed by a first carbonaceous sheet and a second carbonaceous sheet facing each other.

A second aspect of the present disclosure provides an electrode including the pliable carbonaceous pocket composite structure according to the first aspect of the present disclosure.

A third aspect of the present disclosure provides an energy storage device including the electrode according to the second aspect of the present disclosure.

A fourth aspect of the present disclosure provides a method for preparing the pliable carbonaceous pocket composite structure according to the first aspect of the present disclosure, including the following steps:

forming a layered composite including one or more particles, a polymer, and carbonaceous sheets, wherein each of the one or more particles is located between a first carbonaceous sheet and a second carbonaceous sheet facing each other and each of the particles is bonded to each of the first carbonaceous sheet and the second carbonaceous sheet by the polymer in the layered composite; and removing the polymer from the layered composite to obtain the pliable carbonaceous pocket composite structure which includes the one or more particles, each of the particles being encapsulated by each of the one or more first carbonaceous pockets formed by the first carbonaceous sheet and the second carbonaceous sheet facing each other.

Effects of the Invention

A pliable carbonaceous pocket composite structure according to exemplary embodiments of the present disclosure may have excellent dispersive property in a solvent. For example, the pliable carbonaceous pocket composite structure may have excellent dispersive property in various organic solvents such as water, alcohols, organic solvents, and the like, and the pliable carbonaceous pocket composite structure has remarkably excellent dispersive property as compared to carbonaceous materials such as graphene and thus can be easily applied to manufacturing of electrodes or various devices.

According to exemplary embodiments of the present disclosure, it is possible to provide a pliable carbonaceous pocket composite structure including silicon and/or various other particles or electrode materials and also possible to remarkably improve the performance of an energy storage device by applying the pliable carbonaceous pocket composite structure as an anode or cathode in various energy storage devices. Specifically, as compared to a conventional lithium anode using activated carbon only, an electrode manufactured using the pliable carbonaceous pocket composite structure has a high electrochemical reduction potential and thus can achieve high energy density, high specific capacity, and high weight efficiency (Wh/kg). Further, in terms of safety of an electrode material, if the pliable carbonaceous pocket composite structure of the present disclosure contains Si particles, the pliable carbonaceous pocket composite structure is used as a lithium anode and thus can improve electric conductivity and also accommodate the volume expansion of silicon which is caused by void spaces provided by pores within the pliable carbonaceous pocket composite structure during repeated charge/discharge cycles, and, thus, it is possible to suppress expansion and pulverization of numerous active materials for energy storage and also possible to achieve an excellent charge/discharge rate.

According to exemplary embodiments of the present disclosure, it is possible to provide a method which enables ultrafast mass production of the pliable carbonaceous pocket composite structure. In a method for preparing the pliable carbonaceous pocket composite structure according to exemplary embodiments of the present disclosure, various particles such as silicon particles and carbonaceous sheets such as graphene are laminated by a polymer and a layered composite structure including the silicon particles and the graphene sheets can be safely maintained from a pulverization process such as a ball-milling process, and, thus, it is possible to achieve ultrafast mass production of the pliable carbonaceous pocket composite structure using a lithium anode active material without damage to silicon and graphene.

BRIEF DESCRIPTION OF THE DRAWINGS

FIG. 1C is a schematic diagram illustrating a process of preparing a graphene pliable carbonaceous pocket composite structure encapsulating silicon nanoparticles and illustrating a fabrication process for a pliable carbonaceous pocket composite structure encapsulating silicon nanoparticles using ECA in accordance with an example of the present disclosure.

FIG. 1D(i)-1D(iii) show respectively a 50 mL scale batch for Si_GPP fabrication in accordance with an example of the present disclosure.

FIG. 1E(i)-1E(iii) show a 500 mL scale batch for Si_GPP fabrication using silicon nanoparticle of 3.5 g, graphene of 1.5 g, and 150 g of ECA, respectively, in accordance with an example of the present disclosure.

FIG. 1F is a TEM image of a pliable carbonaceous pocket composite structure in accordance with an example of the present disclosure.

FIG. 2C(i)-(iv) are schematic diagrams illustrating a process of preparing a graphene pliable carbonaceous pocket composite structure encapsulating silicon nanoparticles in accordance with an exemplary embodiment of the present disclosure.

FIG. 3 shows the result of structural analyses of Si nanoparticles and graphene composites in accordance with an example of the present disclosure, and FIG. 3A and FIG. 3B are SEM images of the Si_GPP, FIG. 3C shows the cross-section of the Si_GPP, FIG. 3D shows the cross-section of the Si_GPP with BSE mode, FIG. 3E is a TEM image of the Si_GPP, FIG. 3F is a STEM image of the Si_GPP, FIG. 3G is an elemental mapping image of the Si_GPP, and FIG. 3H is a high-resolution STEM image of Si nanoparticles in the Si_GPP.

FIG. 5 shows the result of analysis of electrochemical performances of a full-cell with Si_GPP and representative commercial anodes in accordance with an example of the present disclosure.

FIG. 6 shows schematic diagrams and back scattered electron (BSE) SEM images before and after base etching of Si_ECA_G in accordance with an example of the present disclosure.

FIG. 8 shows Si_GPP mass-produced in accordance with an example of the present disclosure, and FIG. 8A and FIG. 8B are SEM images thereof, FIG. 8C is a STEM image thereof, and FIG. 8D and FIG. 8E are STEM elemental mapping images thereof.

BEST MODE FOR CARRYING OUT THE INVENTION

Figure 1A:
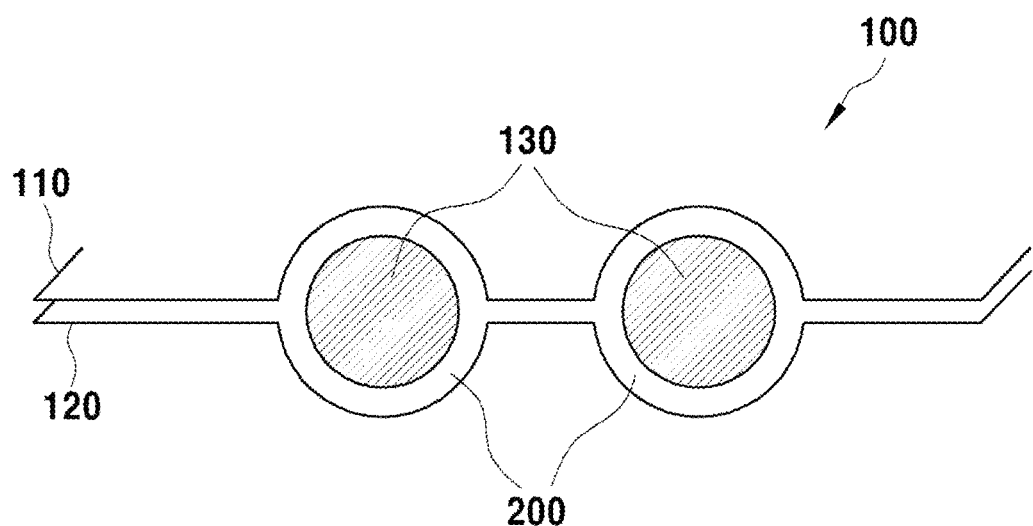
FIG. 1A is a cross-sectional view of a pliable carbonaceous pocket composite structure in accordance with an exemplary embodiment of the present disclosure.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document of the present disclosure.

Throughout the whole document of the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Through the whole document of the present disclosure, the term "on" that is used to designate a position of one element with respect to another element includes both a case that the one element is adjacent to the another element and a case that any other element exists between these two elements.

In addition, through the whole document of the present disclosure, the term "comprises or includes" and/or "comprising or including" used in the document means that one or more other components, steps, operations, and/or the existence or addition of elements are not excluded in addition to the described components, steps, operations and/or elements.

The terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

Through the whole document of the present disclosure, the term "step of" does not mean "step for."

Through the whole document of the present disclosure, the term "combination(s) of" included in Markush type description means mixture or combination(s) of one or more components, steps, operations and/or elements selected from a group consisting of components, steps, operation and/or elements described in Markush type and thereby means that the disclosure includes one or more components, steps, operations and/or elements selected from the Markush group.

Throughout the whole document of the present disclosure, the description "A and/or B" means "A or B, or A and B."

Hereinafter, example embodiments of the present disclosure are described in detail, but the present disclosure may not be limited thereto.

A first aspect of the present disclosure provides a pliable carbonaceous pocket composite structure including a composite which includes one or more particles, each of the particles being encapsulated by each of one or more first carbonaceous pockets formed by a first carbonaceous sheet and a second carbonaceous sheet facing each other.

In an exemplary embodiment of the present disclosure, the first carbonaceous sheet and the second carbonaceous sheet facing each other may contact to each other in one or more regions, and each of one or more regions in which the first carbonaceous sheet and the second carbonaceous sheet do not contact to each other may form the first carbonaceous pockets, but may not be limited thereto (see FIG. 1A).

In an exemplary embodiment of the present disclosure, the one or more first carbonaceous pockets may be formed apart from each other, but may not be limited thereto.

In an exemplary embodiment of the present disclosure, the first carbonaceous pockets may be a closed type pocket or a partially closed type pocket, but may not be limited thereto. For example, the first carbonaceous pocket may wholly or partially wrap the surface of a particle encapsulated therein, but may not be limited thereto.

In an exemplary embodiment of the present disclosure, each of the first carbonaceous sheet and the second carbonaceous sheet may independently include a sheet including graphene, graphite, carbon nanotube, carbon fiber, carbon black, activated carbon, graphene oxide(GO), or reduced graphene oxide(rGO), but may not be limited thereto.

In an exemplary embodiment of the present disclosure, each of the first carbonaceous sheet and the second carbonaceous sheet may have wrinkles, but may not be limited thereto. The first carbonaceous sheet and the second carbonaceous sheet may have pliability like a graphene sheet, and the first carbonaceous sheet and the second carbonaceous sheet may have wrinkles and thus may have elasticity as well as increased pliability, and, thus, the first carbonaceous pocket may have excellent pliability and elasticity and the pliable carbonaceous pocket composite structure may have excellent pliability and elasticity. For example, in the pliable carbonaceous pocket composite structure, the wrinkle(s) may be formed in one or more regions in which the first carbonaceous sheet and the second carbonaceous sheet facing each other contact to each other, and, thus, the first carbonaceous pocket may have excellent pliability and elasticity and the pliable carbonaceous pocket composite structure may have excellent pliability and elasticity.

In an exemplary embodiment of the present disclosure, the first carbonaceous sheet and the second carbonaceous sheet facing each other may contact to each other in one or more regions, and each of one or more regions in which the first carbonaceous sheet and the second carbonaceous sheet do not contact to each other may form the first carbonaceous pockets, but may not be limited thereto.

In an exemplary embodiment of the present disclosure, if the pliable carbonaceous pocket composite structure includes two or more composites, the two or more composites may contact to each other by mutual contact of the first carbonaceous pockets included in each of the composites, but may not be limited thereto.

Figure 1B:
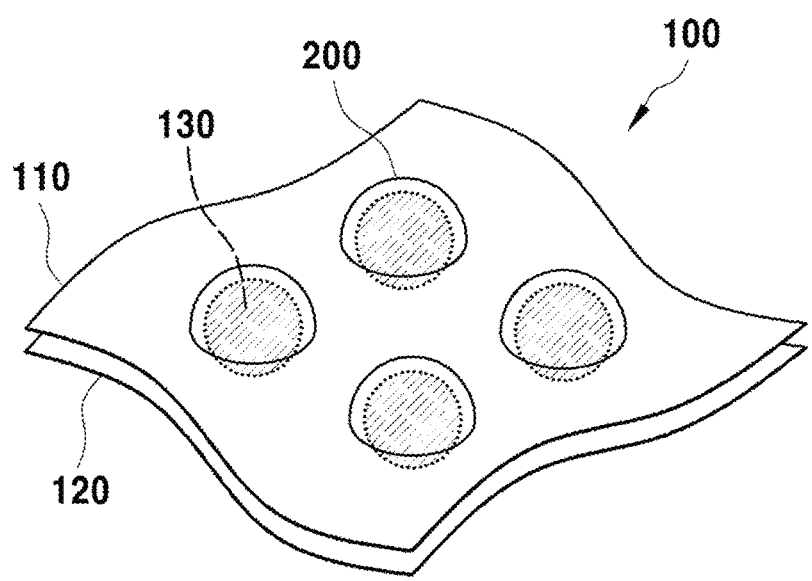
FIG. 1B is a perspective view of the pliable carbonaceous pocket composite structure in accordance with an exemplary embodiment of the present disclosure.

In an exemplary embodiment of the present disclosure, the pliable carbonaceous pocket composite structure may further include a second carbonaceous pocket encapsulating one or more of the composite, but may not be limited thereto (see FIG. 1B).

In an exemplary embodiment of the present disclosure, two or more of the pliable carbonaceous pocket composite structures contact to each other by mutual contact of the second carbonaceous pockets included in each of the pliable carbonaceous pocket composite structures.

In an exemplary embodiment of the present disclosure, the second carbonaceous sheet may include a carbonaceous sheet including graphene, graphite, carbon nanotube, carbon fiber, carbon black, activated carbon, graphene oxide(GO), or reduced graphene oxide(rGO), but may not be limited thereto.

In an exemplary embodiment of the present disclosure, the pliable carbonaceous pocket composite structure may have porosity, but may not be limited thereto.

In an exemplary embodiment of the present disclosure, the second carbonaceous pocket may include a plurality of carbonaceous sheets, but may not be limited thereto.

In an exemplary embodiment of the present disclosure, the one or more particles may have semiconductive, conductive, or insulating property, but may not be limited thereto.

In an exemplary embodiment of the present disclosure, the one or more particles may include an electrode material, but may not be limited thereto.

In an exemplary embodiment of the present disclosure, the one or more particles or the electrode material may use any material known in the art without particular limitations and may include, for example, one or more elements selected from the group of Si, Ge, Sn, Cd, Sb, Pb, Bi, Zn, Al, Co, Ni, Ti, Te, Mn, Fe, W, Ag, Au, Pt, V, Cu, Ga, P, and S, but may not be limited thereto. For example, the electrode material may include the one or more elements or a compound thereof, or an alloy of two or more of the elements, but may not be limited thereto.

In an exemplary embodiment of the present disclosure, a weight ratio of the carbonaceous sheets to the one or more particles is not particularly limited and may be, for example, about 1:0.001 or more, but may not be limited thereto. For example, the weight ratio of the carbonaceous sheets to the one or more particles may be about 1:0.001 or more, from about 1:0.001 to about 1,000, from about 1:0.001 to about 500, from about 1:0.001 to about 100, from about 1:0.001 to about 10, from about 1:0.01 to about 1,000, from about 1:0.01 to about 500, from about 1:0.01 to about 100, from about 1:0.01 to about 10, from about 1:0.1 to about 1,000, from about 1:0.1 to about 500, from about 1:0.1 to about 10, or from about 1:0.1 to about 10, but may not be limited thereto.

In an exemplary embodiment of the present disclosure, the one or more particles may be nanoparticles or may have a size of about 1 µm or less, but may not be limited thereto. For example, the one or more particles may have a size of about 1,000 nm or less, about 100 nm or less, about 10 nm or less, or about 1 nm or less, but may not be limited thereto. For example, the one or more particles may have a size of about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the size of the pliable carbonaceous pocket composite structure may be determined by the size of one or more particles encapsulated by the structure or the size of a carbonaceous sheet forming the first carbonaceous pocket, but may not be limited thereto. For example, the size of the pliable carbonaceous pocket composite structure may be equal to or greater than the size of one or more particles encapsulated by the structure, or may be equal to or greater than the size of a carbonaceous sheet forming the first carbonaceous pocket, but may not be limited thereto. For example, if the pliable carbonaceous pocket composite structure further includes the second carbonaceous pocket, the size of the pliable carbonaceous pocket composite structure may be equal to or greater than the sum of the size of the one or more particles and the thickness of the second carbonaceous pocket, but may not be limited thereto. For example, the height of the pliable carbonaceous pocket composite structure may be determined considering the size of the one or more particles and/or the thickness of the second carbonaceous pocket and the width of the pliable carbonaceous pocket composite structure may be determined considering the width of the carbonaceous sheet forming the first carbonaceous pocket and/or the thickness of the second carbonaceous pocket, but may not be limited thereto.

For example, the pliable carbonaceous pocket composite structure may have a size of from nanometer to micrometer or more, but may not be limited thereto. For example, the size of the pliable carbonaceous pocket composite structure is not particularly limited and may be regulated by the size of the carbonaceous nanosheet forming the pliable carbonaceous pocket composite structure and laminating of the composites. For example, the pliable carbonaceous pocket composite structure may have a size of about 100 μm or less, about 10 μm or less, about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 μm, from about 10 nm to about 50 μm, from about 10 nm to about 10 μm, from about 10 nm to about 1 μm, from about 10 nm to about 500 nm, from about 10 nm to about 100 nm, from about 100 nm to about 100 μm, from about 100 nm to about 50 μm, from about 100 nm to about 10 μm, or from about 100 nm to about 1 μm, but may not be limited thereto.

In an exemplary embodiment of the present disclosure, the pliable carbonaceous pocket composite structure may have excellent dispersive property in a solvent. For example, the pliable carbonaceous pocket composite structure may have excellent dispersive property in various organic solvents such as water, alcohols, organic solvents, and the like, and the pliable carbonaceous pocket composite structure has remarkably excellent dispersive property as compared to carbonaceous materials such as graphene and thus can be easily applied to manufacturing of electrodes or various devices.

In an exemplary embodiment of the present disclosure, the zeta-potential of the pliable carbonaceous pocket composite structure can be measured by the method known in the art, and it would be easily understood by one of ordinary skill in the art that the zeta-potential of the pliable carbonaceous pocket composite structure may have various values depending on the kind of solvent. For example, the zeta-potential of the pliable carbonaceous pocket composite structure may be about +10 mV or more or about −10 mV or less, and, thus, the pliable carbonaceous pocket composite structure has excellent dispersive property in a solvent. For example, the zeta-potential of the pliable carbonaceous pocket composite structure may be about +10 mV or more or about −10 mV or less, about +20 mV or more or about −20 mV or less, about +30 mV or more or about −30 mV or less, about +50 mV or more or about −50 mV or less, about +60 mV or more or about −60 mV or less, about +80 mV or more or about −80 mV or less, about +100 mV or more or about −100 mV or less, from about ±10 mV to about ±100 mV, from about ±10 mV to about ±80 mV, from about ±10 mV to about ±60 mV, or from about ±10 mV to about ±40 mV, but may not be limited thereto.

A second aspect of the present disclosure provides an electrode including the pliable carbonaceous pocket composite structure according to the first aspect of the present disclosure.

In an exemplary embodiment of the present disclosure, the electrode may be used as an anode or cathode in an energy storage device, but may not be limited thereto.

A third aspect of the present disclosure provides an energy storage device including the electrode including the pliable carbonaceous pocket composite structure according to the second aspect of the present disclosure.

In an exemplary embodiment of the present disclosure, the electrode may be used as an anode or cathode in the energy storage device, but may not be limited thereto.

In an exemplary embodiment of the present disclosure, the energy storage device may be a battery, a capacitor, or a battery-capacitor hybrid, but may not be limited thereto.

In an exemplary embodiment of the present disclosure, the energy storage device may be a Li-ion battery, Na-ion battery, Li-air battery, Na-air battery, Li-metal battery, Na-metal battery, Li-ion hybrid capacitor, or Na-ion hybrid capacitor, but may not be limited thereto.

In an exemplary embodiment of the present disclosure, the electrode material including one or more elements selected from the group of Si, Fe, Ni, Co, Al, Ge, Sn, Mn, Ti, V, Cu, Zn, W, Ag, Pt, Ga, P, Au, Sb, Te, Pb, Bi, and Cd as the particles encapsulated in the pliable carbonaceous pocket composite structure may be used as an anode, but may not be limited thereto. For example, the one or more particles may include the element or a compound or alloy including the element, but may not be limited thereto.

In an exemplary embodiment of the present disclosure, the electrode material including S as the particles encapsulated in the pliable carbonaceous pocket composite structure may be used as a cathode, but may not be limited thereto.

In an exemplary embodiment of the present disclosure, the one or more particles may be alloyed with another metal element which can be used as an electrode material, but may not be limited thereto.

Hereinafter, the electrode according to the second aspect of the present disclosure and the energy storage device according to the third aspect of the present disclosure will be described, and all the descriptions of the first aspect of the present disclosure can be applied to the second aspect of the present disclosure and the third aspect of the present disclosure, even though they are omitted hereinafter.

In an exemplary embodiment of the present disclosure, the pliable carbonaceous pocket composite structure may include a composite which includes one or more particles, each of the particles being encapsulated by each of one or more first carbonaceous pockets formed by a first carbonaceous sheet and a second carbonaceous sheet facing each other.

In an exemplary embodiment of the present disclosure, the first carbonaceous sheet and the second carbonaceous sheet facing each other may contact to each other in one or more regions, and each of one or more regions in which the first carbonaceous sheet and the second carbonaceous sheet do not contact to each other may form the first carbonaceous pockets, but may not be limited thereto.

In an exemplary embodiment of the present disclosure, the one or more first carbonaceous pockets may be formed apart from each other, but may not be limited thereto.

In an exemplary embodiment of the present disclosure, the first carbonaceous pocket may be a closed type pocket or a partially closed type pocket, but may not be limited thereto. For example, the first carbonaceous pocket may wholly or partially wrap the surface of a particle encapsulated therein, but may not be limited thereto.

In an exemplary embodiment of the present disclosure, each of the first carbonaceous sheet and the second carbonaceous sheet may independently include a sheet including graphene, graphite, carbon nanotube, carbon fiber, carbon black, activated carbon, graphene oxide(GO), or reduced graphene oxide(rGO), but may not be limited thereto.

In an exemplary embodiment of the present disclosure, each of the first carbonaceous sheet and the second carbonaceous sheet may have wrinkles, but may not be limited thereto. The first carbonaceous sheet and the second carbonaceous sheet may have pliability like a graphene sheet, and the first carbonaceous sheet and the second carbonaceous sheet may have wrinkles and thus may have elasticity as well as increased pliability, and, thus, the first carbonaceous pocket may have excellent pliability and elasticity and the pliable carbonaceous pocket composite structure may have excellent pliability and elasticity. For example, in the pliable carbonaceous pocket composite structure, the wrinkle(s) may be formed in one or more regions in which the first carbonaceous sheet and the second carbonaceous sheet facing each other contact to each other, and, thus, the first carbonaceous pocket may have excellent pliability and elasticity and the pliable carbonaceous pocket composite structure may have excellent pliability and elasticity.

In an exemplary embodiment of the present disclosure, the first carbonaceous sheet and the second carbonaceous sheet facing each other may contact to each other in one or more regions, and each of one or more regions in which the first carbonaceous sheet and the second carbonaceous sheet do not contact to each other may form the first carbonaceous pockets, but may not be limited thereto.

In an exemplary embodiment of the present disclosure, if the pliable carbonaceous pocket composite structure includes two or more composites, the two or more composites may contact to each other by mutual contact of the first carbonaceous pockets included in each of the composites, but may not be limited thereto.

In an exemplary embodiment of the present disclosure, the pliable carbonaceous pocket composite structure may further include a second carbonaceous pocket encapsulating one or more of the composite, but may not be limited thereto.

In an exemplary embodiment of the present disclosure, two or more of the pliable carbonaceous pocket composite structures contact to each other by mutual contact of the second carbonaceous pockets included in each of the pliable carbonaceous pocket composite structures.

In an exemplary embodiment of the present disclosure, the second carbonaceous sheet may include a carbonaceous sheet including graphene, graphite, carbon nanotube, carbon fiber, carbon black, activated carbon, graphene oxide(GO), or reduced graphene oxide(rGO), but may not be limited thereto.

In an exemplary embodiment of the present disclosure, the pliable carbonaceous pocket composite structure may have porosity, but may not be limited thereto.

In an exemplary embodiment of the present disclosure, the second carbonaceous pocket may include a plurality of carbonaceous sheets, but may not be limited thereto.

In an exemplary embodiment of the present disclosure, the one or more particles may have semiconductive, conductive, or insulating property, but may not be limited thereto.

In an exemplary embodiment of the present disclosure, the one or more particles may include an electrode material, but may not be limited thereto.

In an exemplary embodiment of the present disclosure, the one or more particles or the electrode material may use any material known in the art without particular limitations and may include, for example, one or more elements selected from the group of Si, Ge, Sn, Cd, Sb, Pb, Bi, Zn, Al, Co, Ni, Ti, Te, Mn, Fe, W, Ag, Au, Pt, V, Cu, Ga, P, and S, but may not be limited thereto. For example, the electrode material may include the one or more elements or a compound thereof, or an alloy of two or more of the elements, but may not be limited thereto.

In an exemplary embodiment of the present disclosure, a weight ratio of the carbonaceous sheets to the one or more particles is not particularly limited and may be, for example, about 1:0.001 or more, but may not be limited thereto. For example, the weight ratio of the carbonaceous sheets to the one or more particles may be about 1:0.001 or more, from about 1:0.001 to about 1,000, from about 1:0.001 to about 500, from about 1:0.001 to about 100, from about 1:0.001 to about 10, from about 1:0.01 to about 1,000, from about 1:0.01 to about 500, from about 1:0.01 to about 100, from about 1:0.01 to about 10, from about 1:0.1 to about 1,000, from about 1:0.1 to about 500, from about 1:0.1 to about 10, or from about 1:0.1 to about 10, but may not be limited thereto.

In an exemplary embodiment of the present disclosure, the one or more particles may be nanoparticles or may have a size of about 1 μm or less, but may not be limited thereto. For example, the one or more particles may have a size of about 1,000 nm or less, about 100 nm or less, about 10 nm or less, or about 1 nm or less, but may not be limited thereto.

For example, the one or more particles may have a size of about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the size of the pliable carbonaceous pocket composite structure may be determined by the size of one or more particles encapsulated by the structure or the size of a carbonaceous sheet forming the first carbonaceous pocket, but may not be limited thereto. For example, the size of the pliable carbonaceous pocket composite structure may be equal to or greater than the size of one or more particles encapsulated by the structure, or may be equal to or greater than the size of a carbonaceous sheet forming the first carbonaceous pocket, but may not be limited thereto. For example, if the pliable carbonaceous pocket composite structure further includes the second carbonaceous pocket, the size of the pliable carbonaceous pocket composite structure may be equal to or greater than the sum of the size of the one or more particles and the thickness of the second carbonaceous pocket, but may not be limited thereto. For example, the height of the pliable carbonaceous pocket composite structure may be determined considering the size of the one or more particles and/or the thickness of the second carbonaceous pocket and the width of the pliable carbonaceous pocket composite structure may be determined considering the width of the carbonaceous sheet forming the first carbonaceous pocket and/or the thickness of the second carbonaceous pocket, but may not be limited thereto.

For example, the pliable carbonaceous pocket composite structure may have a size of from nanometer to micrometer or more, but may not be limited thereto. For example, the size of the pliable carbonaceous pocket composite structure is not particularly limited and may be regulated by the size of the carbonaceous nanosheet forming the pliable carbonaceous pocket composite structure and laminating of the composites. For example, the pliable carbonaceous pocket composite structure may have a size of about 100 μm or less, about 10 μm or less, about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 μm, from about 10 nm to about 50 μm, from about 10 nm to about 10 μm, from about 10 nm to about 1 μm, from about 10 nm to about 500 nm, from about 10 nm to about 100 nm, from about 100 nm to about 100 μm, from about 100 nm to about 50 μm, from about 100 nm to about 10 μm, or from about 100 nm to about 1 μm, but may not be limited thereto.

In an exemplary embodiment of the present disclosure, the pliable carbonaceous pocket composite structure may have excellent dispersive property in a solvent. For example, the pliable carbonaceous pocket composite structure may have excellent dispersive property in various organic solvents such as water, alcohols, organic solvents, and the like, and the pliable carbonaceous pocket composite structure has remarkably excellent dispersive property as compared to carbonaceous materials such as graphene and thus can be easily applied to manufacturing of electrodes or various devices.

In an exemplary embodiment of the present disclosure, the zeta-potential of the pliable carbonaceous pocket composite structure can be measured by the method known in the art, and it would be easily understood by one of ordinary skill in the art that the zeta-potential of the pliable carbonaceous pocket composite structure may have various values depending on the kind of solvent. For example, the zeta-potential of the pliable carbonaceous pocket composite structure may be about +10 mV or more or about −10 mV or less, and, thus, the pliable carbonaceous pocket composite structure has excellent dispersive property in a solvent. For example, the zeta-potential of the pliable carbonaceous pocket composite structure may be about +10 mV or more or about −10 mV or less, about +20 mV or more or about −20 mV or less, about +30 mV or more or about −30 mV or less, about +50 mV or more or about −50 mV or less, about +60 mV or more or about −60 mV or less, about +80 mV or more or about −80 mV or less, about +100 mV or more or about −100 mV or less, from about ±10 mV to about ±100 mV, from about ±10 mV to about ±80 mV, from about ±10 mV to about ±60 mV, or from about ±10 mV to about ±40 mV, but may not be limited thereto.

In an exemplary embodiment of the present disclosure, the energy storage device may be a battery, a capacitor, or a battery-capacitor hybrid, but may not be limited thereto.

In an exemplary embodiment of the present disclosure, the energy storage device may be a Li-ion battery, Na-ion battery, Li-air battery, Na-air battery, Li-metal battery, Na-metal battery, Li-ion hybrid capacitor, or Na-ion hybrid capacitor, but may not be limited thereto.

The energy storage device according to an exemplary embodiment of the present disclosure may include the electrode material as an anode and/or a cathode and may include an electrolyte, but may not be limited thereto.

In the energy storage device according to an exemplary embodiment of the present disclosure, if the electrode is included as an anode and/or a cathode, the anode and/or the cathode may be formed by the method known in the art, such as by coating or pasting the carbonaceous structure on metal foil such as Cu foil, but may not be limited thereto.

The energy storage device according to an exemplary embodiment of the present disclosure may include the electrode as an anode and/or a cathode and may include an electrolyte and a separator, but may not be limited thereto. The electrolyte and the separator may use any electrolyte and separator known in the art and appropriately selected by one of ordinary skill in the art without particular limitations.

For example, the separator which is typically used in a Li-ion battery, a Li-ion hybrid capacitor, and the like is a component configured to separate a cathode and an anode and thus suppress electrical contact between the electrodes and requires thinning, high strength, ion permeability and current blocking property for the safety of a battery. The separator is defined between the anode and the cathode to suppress short circuit and may use any separator typically used in the art without particular limitations. The separator may be mainly formed of, for example, PE, PP, a PE/PP lamination or a PE/PP phase-separated structure, but may not be limited thereto. For example, the separator may be a porous polymer membrane which is provided as a conduit for Li ions which shuttle between the electrodes. The cathode, the anode, and the separator may form together a "battery stack". The battery stack and the electrolyte are hermetically sealed within a metallic battery casing which also provides contact to an external circuit.

For example, the electrode material may be selected on the basis of combinations of cathode active materials and anode active materials known in the art and their compatibility with a selected electrolyte. For example, a cathode active material suitable for the energy storage device such as a Li-ion battery, a Li-ion hybrid capacitor, and the like may include a member selected from the group consisting of $LiCoO_2$, $LiMn_2O_4$, $LiFePO_4$, $Li_{1-x}Fe_xPO_4$ ($0 \leq x \leq 1$), $Li[Mn_{2-x} M_x]O_4$ (M=Co, Ni, Cr, Al, and/or Mg, $0 \leq x \leq 0.1$), $Li_aCoM_xO_2$, $Li_{1-b}CoM'_yO_2$ (M and M'=W, Mo Zr, Ti, Mg, Ta, Al, Fe, V, Cr, and/or Nb; $1 \leq a \leq 1.2$, $0 \leq b \leq 0.05$, $0 \leq x \leq 0.02$ and $0 \leq x \leq 0.02$), $LiNiO_2$, $LiNiMnCoO_2$, $Li_2FePO_4F$, $LiCo_{0.33}Ni_{0.33}Mn_{0.33}O_2$, $Li(Li_aNi_xMn_yCo_z)O_2$ (also known as NMC), $LiNiCoAlO_2$, $Li_4Ti_5O_{12}$, $Li_3V_2(PO_4)_3$ and combinations thereof, but may not be limited thereto. For example, the active material may be applied in the form of a suspension of nanoparticles having an average particle size (for example, diameter) in the range of from about 10 nm to about 1000 nm, but may not be limited thereto, and some materials are commercially available in an appropriate size range.

For example, the electrolyte is a component configured to facilitate ion exchange between the anode and the cathode, and in recent years, an ionic liquid electrolyte or a gel polymer electrolyte having low volatility and flammability has been mainly used, but the electrolyte may not be limited thereto. Specifically, the electrolyte may include an organic solvent and a Li salt. The organic solvent may use any one without particular limitations as long as it can serve as a medium through which ions involved in an electrochemical reaction of a battery can be transferred. Specifically, as the organic solvent, ester-based solvents such as methyl acetate, ethyl acetate, butyrolactone, caprolactone, and the like; ether-based solvents such as dibutyl ether, tetrahydrofuran, or the like; ketone-based solvents such as cyclohexanone; aromatic hydrocarbon-based solvents such as benzene, fluorobenzene, and the like; carbonate-based solvents such as dimethylcarbonate (DMC), diethylcarbonate (DEC), methylethylcarbonate (MEC), ethylmethylcarbonate (EMC), ethylene carbonate (EC), propylene carbonate (PC), and the like; alcohol-based solvents such as ethyl alcohol, isopropyl alcohol, and the like; nitriles such as R—CN (R is a $C_2$ to $C_{20}$ straight-chain, branched-chain or cyclic hydrocarbon group and may include a double bond, an aromatic ring, or an ether bond); amides such as dimethylformamide and the like; dioxolanes such as 1,3-dioxolane and the like; or sulfolanes may be used. Particularly, a carbonate-based solvent is desirable, and a mixture of cyclic carbonate (for example, ethylene carbonate or propylene carbonate) having high ionic conductivity and high dielectric constant to improve charge/discharge performance of a battery and a linear carbonate-based compound (for example, ethylmethylcarbonate, dimethylcarbonate, or diethylcarbonate) having low viscosity is more desirable. In this case, cyclic carbonate and chain carbonate may be used as mixed together in a volume ratio of about 1:1 to about 1:9 to show excellent electrolyte performance.

The Li salt may use any compound without particular limitations as long as it can provide Li ions to be used in a Li secondary battery. Specifically, the Li salt may use $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_6SO_3)_2$, $LiN(C_2F_6SO_2)_2$, $LiN(CF_3SO_2)_2$, $LiCl$, $LiI$, or $LiB(C_2O_4)_2$.

For example, a liquid electrolyte may include $LiPF_6$-EC/DEC, a solid polymer electrolyte may include $LiBF_4$+PEO, a gel polymer electrolyte may include $LiPF_6$-EC/DMC+PVdF-HFP, and an ionic liquid electrolyte may include LiTFSI-EMITFSI, but may not be limited thereto.

The carbonaceous structure according to an exemplary embodiment of the present disclosure has a high specific surface area and a high porosity, and when it is used as an electrode material of the energy storage device, ions can be easily transferred and stored and many active sites are formed, and, thus, it is possible to achieve high energy density, high power density, and excellent charge/discharge capacity ratio.

In an exemplary embodiment of the present disclosure, if an electrode including the pliable carbonaceous pocket composite structure of the present disclosure is used as the anode, the one or more particles included in the pliable carbonaceous pocket composite structure include one or more elements selected from the group of Sb, Pb, Bi, Zn, Al, Co, Ni, Ti, Te, Mn, Fe, W, Ag, Au, Pt, V, Cu, Ga, and P, and, thus, as compared to a conventional lithium anode including activated carbon only, the electrode has a high electrochemical reduction potential and thus can achieve high energy density, high specific capacity, and high weight efficiency (Wh/kg), and in terms of stability, the electrode can accommodate the volume expansion of the one or more particles such as silicon which occurs during repeated charge/discharge cycles, due to pliability and elasticity of the first carbonaceous pocket or the first carbonaceous pocket and the second carbonaceous pocket included in the pliable carbonaceous pocket composite structure and thus can suppress expansion and pulverization of numerous active materials for energy storage.

The electrolyte is a component configured to facilitate ion exchange between the anode and the cathode, and in recent years, an ionic liquid electrolyte or a gel polymer electrolyte having low volatility and flammability has been mainly used, but the electrolyte may not be limited thereto. For example, a liquid electrolyte may include $LiPF_6$-EC/DEC, a solid polymer electrolyte may include $LiBF_4$+PEO, a gel polymer electrolyte may include $LiPF_6$-EC/DMC+PVdF-HFP, and an ionic liquid electrolyte may include LiTFSI-EMITFSI, but may not be limited thereto.

A fourth aspect of the present disclosure provides a method for preparing the pliable carbonaceous pocket composite structure according to the first aspect of the present disclosure, including the following steps:

(a) forming a layered composite including one or more particles, a polymer, and carbonaceous sheets, wherein each of the one or more particles is located between a first carbonaceous sheet and a second carbonaceous sheet facing each other and each of the particles is—>and bonded to each of the first carbonaceous sheet and the second carbonaceous sheet by the polymer in the layered composite; and (b) removing the polymer from the layered composite to obtain the pliable carbonaceous pocket composite structure which includes the one or more particles, each of the particles being encapsulated by each of the one or more first carbonaceous pockets formed by the first carbonaceous sheet and the second carbonaceous sheet facing each other.

In an exemplary embodiment of the present disclosure, the step (b) of the method for preparing the pliable carbonaceous pocket composite structure may further include pulverizing the layered composite prior to removing the polymer so as to form a particulate of the layered composite, and then removing the polymer from the particulate so as to form a second carbonaceous pocket encapsulating one or more of the composites.

pulverizing the layered composite prior to heat treatment to the polymer to form a particulate of the layered composite, and then removing the polymer from the particulate of the layered composite so as to form a second carbonaceous pocket encapsulating one or more of the composites, but may not be limited thereto. For example, the polymer may be removed by heat treatment including heating at a temperature at which the polymer can be removed by pyrolysis or evaporation, or the polymer may be removed using a solvent suitable for dissolving the polymer, but may not be limited thereto. The heating temperature and the solvent for removing the polymer may be appropriately selected by one of ordinary skill in the art depending on the kind of polymer to be used.

In an exemplary embodiment of the present disclosure, the pulverizing of the layered composite is used to mass-produce the pliable carbonaceous pocket composite structure and may be performed by ball-milling, grinding, mixing, or sieving, but may not be limited thereto. The pulverizing may be performed within a short time, such as about 1 hour, to pulverize and particulate the layered composite and thus form a particulate, which is an agglomeration of the one or more particles, of the layered composite, and, thus, it is possible to mass-produce the pliable carbonaceous pocket composite structure within a short time.

According to an exemplary embodiment of the present disclosure, it is possible to provide a method which enables ultrafast mass production of the pliable carbonaceous pocket composite structure. In the conventional technology, if a ball-milling process is used for manufacturing an electrode material, a carbonaceous material such as graphene may be easily damaged and silicon may be exposed, which may cause problems in a LIB such as volume expansion and SEI layer growth and damage. However, in the method for preparing the pliable carbonaceous pocket composite structure according to exemplary embodiment of the present disclosure, various particles such as silicon particles and carbonaceous sheets such as graphene are laminated by a polymer and a layered composite structure including the silicon particles and the graphene sheets can be safely maintained from a pulverization process such as the ball-milling process, and, thus, it is possible to achieve ultrafast mass production of the pliable carbonaceous pocket composite structure using a lithium anode active material without damage to silicon and graphene.

In an exemplary embodiment of the present disclosure, the polymer in the step (a) may be formed by a process which includes adding a monomer for forming the polymer to a solution including the carbonaceous sheets in a solvent and the particles to polymerize so that each of the particles is bonded to each of the first carbonaceous sheet and the second carbonaceous sheet by the polymer, but may not be limited thereto.

In an exemplary embodiment of the present disclosure, in the step (a) of the method for preparing the pliable carbonaceous pocket composite structure, the monomer for forming the polymer is polymerized on the surface of each of the carbonaceous sheets and the surface of each of the particle(s) to form the polymer, and, thus, the one or more particles are bonded to the first carbonaceous sheet and the second carbonaceous sheet by the polymer, but may not be limited thereto.

In an exemplary embodiment of the present disclosure, the monomer for forming the polymer in the step (a) may include an anionic polymerizable monomer, but may not be limited thereto.

In an exemplary embodiment of the present disclosure, the polymer in the step (a) may be formed by polymerizing the anionic polymerizable monomer and may further use a polymerization initiator if necessary, but may not be limited thereto. The polymerization initiator may use any one known in the art without particular limitations.

In an exemplary embodiment of the present disclosure, the anionic polymerizable monomer for forming the polymer may use any one known in the art without particular limitations, and may include, for example, base addition salts such as a $C_{1-10}$ alkyl cyanoacrylate; an acrylic acid, methacrylic acid, itaconic acid, 2-acrylamido-2-methylpropanesulfonic acid, sulfopropyl acrylate or methacrylate or other water-soluble forms thereof or other polymerizable carboxylic or sulfonic acids, a sulfomethylated acrylamide, an allyl sulfonate, styrene sulfonic acid, sodium vinyl sulfonate, and the like, but may not be limited thereto. In an exemplary embodiment of the present disclosure, the $C_{1-10}$ alkyl included in the $C_{1-10}$ alkyl cyanoacrylate may include methyl, ethyl, propyl, butyl, pentyl, hexyl, heptyl, octyl, nonyl, decyl, or all the possible linear or branched isomers thereof.

In an exemplary embodiment of the present disclosure, in the step (a) of the method for preparing the pliable carbonaceous pocket composite structure, the monomer for forming the polymer may be polymerized by water present on the surface of each of the carbonaceous sheets and the surface of each of the particles, but may not be limited thereto.

In an exemplary embodiment of the present disclosure, the solvent in the step (a) may be evaporated and removed by heat from the polymerization reaction of the monomer for forming the polymer, or removed after the polymerization reaction, so as to form pores in the pliable carbonaceous pocket composite structure, but may not be limited thereto. For example, in an exemplary embodiment of the present disclosure, the solvent in the step (a) can dissolve the polymer and may have a boiling point of 100° C. or less, but may not be limited thereto. The solvent may use, for example, methanol, isopropyl alcohol, or other alcohols or organic solvents having a boiling point of 100° C. or less.

In an exemplary embodiment of the present disclosure, the particulate of the layered composite obtained by the pulverizing in the step (b) may have a size of micrometer or more, but may not be limited thereto.

In an exemplary embodiment of the present disclosure, the method for preparing the pliable carbonaceous pocket composite structure may further include removing the particles which are not encapsulated and present at an exterior surface of the particulate, prior to removing the polymer from the particulate obtained by pulverizing the layered composite, but may not be limited thereto. The removing of the particles which are not encapsulated and present at an exterior surface of the particulate may be performed by dissolving and removing the particles with a solvent which can dissolve the particles. For example, if the particles include S, the removing of the non-encapsulated particles may be performed by using a basic solution, but may not be limited thereto. For example, the basic solution may include a strongly basic aqueous solution including potassium hydroxide, calcium hydroxide, and the like, but may not be limited thereto.

According to exemplary embodiments of the present disclosure, it is possible to provide a method which enables ultrafast mass production of the pliable carbonaceous pocket composite structure. In the conventional technology, if a ball-milling process is used for manufacturing an electrode material, a carbonaceous material such as graphene may be easily damaged and silicon may be exposed, which may cause problems in a LIB such as volume expansion and SEI layer growth and damage. However, in the method for preparing the pliable carbonaceous pocket composite structure according to exemplary embodiment of the present disclosure, various particles such as silicon particles and carbonaceous sheets such as graphene are laminated by a polymer and a layered composite structure including the silicon particles and the graphene sheets can be safely maintained from a pulverization process such as the ball-milling process, and, thus, it is possible to achieve ultrafast mass production of the pliable carbonaceous pocket composite structure using a lithium anode active material without damage to silicon and graphene.

In an exemplary embodiment of the present disclosure, the pliable carbonaceous pocket composite structure may include a composite which includes one or more particles, each of the particles being encapsulated by each of one or more first carbonaceous pockets formed by a first carbonaceous sheet and a second carbonaceous sheet facing each other.

In an exemplary embodiment of the present disclosure, the first carbonaceous sheet and the second carbonaceous sheet facing each other may contact to each other in one or more regions, and each of one or more regions in which the first carbonaceous sheet and the second carbonaceous sheet do not contact to each other may form the first carbonaceous pockets, but may not be limited thereto.

In an exemplary embodiment of the present disclosure, the one or more first carbonaceous pockets may be formed apart from each other, but may not be limited thereto.

In an exemplary embodiment of the present disclosure, the first carbonaceous pocket may be a closed type pocket or a partially closed type pocket, but may not be limited thereto. For example, the first carbonaceous pocket may wholly or partially wrap the surface of a particle encapsulated therein, but may not be limited thereto.

In an exemplary embodiment of the present disclosure, each of the first carbonaceous sheet and the second carbonaceous sheet may independently include a sheet including graphene, graphite, carbon nanotube, carbon fiber, carbon black, activated carbon, graphene oxide(GO), or reduced graphene oxide(rGO), but may not be limited thereto.

In an exemplary embodiment of the present disclosure, each of the first carbonaceous sheet and the second carbonaceous sheet may have wrinkles, but may not be limited thereto. The first carbonaceous sheet and the second carbonaceous sheet may have pliability like a graphene sheet, and the first carbonaceous sheet and the second carbonaceous sheet may have wrinkles and thus may have elasticity as well as increased pliability, and, thus, the first carbonaceous pocket may have excellent pliability and elasticity and the pliable carbonaceous pocket composite structure may have excellent pliability and elasticity. For example, in the pliable carbonaceous pocket composite structure, the wrinkle(s) may be formed in one or more regions in which the first carbonaceous sheet and the second carbonaceous sheet facing each other contact to each other, and, thus, the first carbonaceous pocket may have excellent pliability and elasticity and the pliable carbonaceous pocket composite structure may have excellent pliability and elasticity.

In an exemplary embodiment of the present disclosure, the first carbonaceous sheet and the second carbonaceous sheet facing each other may contact to each other in one or more regions, and each of one or more regions in which the first carbonaceous sheet and the second carbonaceous sheet do not contact to each other may form the first carbonaceous pockets, but may not be limited thereto.

In an exemplary embodiment of the present disclosure, if the pliable carbonaceous pocket composite structure includes two or more composites, the two or more composites may contact to each other by mutual contact of the first carbonaceous pockets included in each of the composites, but may not be limited thereto.

In an exemplary embodiment of the present disclosure, the pliable carbonaceous pocket composite structure may further include a second carbonaceous pocket encapsulating one or more of the composite, but may not be limited thereto.

In an exemplary embodiment of the present disclosure, the second carbonaceous sheet may include a carbonaceous sheet including graphene, graphite, carbon nanotube, carbon fiber, carbon black, activated carbon, graphene oxide(GO), or reduced graphene oxide(rGO), but may not be limited thereto.

In an exemplary embodiment of the present disclosure, the pliable carbonaceous pocket composite structure may have porosity, but may not be limited thereto.

In an exemplary embodiment of the present disclosure, the second carbonaceous pocket may include a plurality of carbonaceous sheets, but may not be limited thereto.

In an exemplary embodiment of the present disclosure, the one or more particles may have semiconductive, conductive, or insulating property, but may not be limited thereto.

In an exemplary embodiment of the present disclosure, the one or more particles may include an electrode material, but may not be limited thereto.

In an exemplary embodiment of the present disclosure, the one or more particles or the electrode material may use any material known in the art without particular limitations and may include, for example, one or more elements selected from the group of Si, Ge, Sn, Cd, Sb, Pb, Bi, Zn, Al, Co, Ni, Ti, Te, Mn, Fe, W, Ag, Au, Pt, V, Cu, Ga, P, and S, but may not be limited thereto. For example, the electrode material may include the one or more elements or a compound thereof, or an alloy of two or more of the elements, but may not be limited thereto.

In an exemplary embodiment of the present disclosure, a weight ratio of the carbonaceous sheets to the one or more particles is not particularly limited and may be, for example, about 1:0.001 or more, but may not be limited thereto. For example, the weight ratio of the carbonaceous sheets to the one or more particles may be about 1:0.001 or more, from about 1:0.001 to about 1,000, from about 1:0.001 to about 500, from about 1:0.001 to about 100, from about 1:0.001 to about 10, from about 1:0.01 to about 1,000, from about 1:0.01 to about 500, from about 1:0.01 to about 100, from about 1:0.01 to about 10, from about 1:0.1 to about 1,000, from about 1:0.1 to about 500, from about 1:0.1 to about 10, or from about 1:0.1 to about 10, but may not be limited thereto.

In an exemplary embodiment of the present disclosure, the one or more particles may be nanoparticles or may have a size of about 1 µm or less, but may not be limited thereto. For example, the one or more particles may have a size of about 1,000 nm or less, about 100 nm or less, about 10 nm or less, or about 1 nm or less, but may not be limited thereto. For example, the one or more particles may have a size of about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the size of the pliable carbonaceous pocket composite structure may be determined by the size of one or more particles encapsulated by the structure or the size of a carbonaceous sheet forming the first carbonaceous pocket, but may not be limited thereto. For example, the size of the pliable carbonaceous pocket composite structure may be equal to or greater than the size of one or more particles encapsulated by the structure, or may be equal to or greater than the size of a carbonaceous sheet forming the first carbonaceous pocket, but may not be limited thereto. For example, if the pliable carbonaceous pocket composite structure further includes the second carbonaceous pocket, the size of the pliable carbonaceous pocket composite structure may be equal to or greater than the sum of the size of the one or more particles and the thickness of the second carbonaceous pocket, but may not be limited thereto. For example, the height of the pliable carbonaceous pocket composite structure may be determined considering the size of the one or more particles and/or the thickness of the second carbonaceous pocket and the width of the pliable carbonaceous pocket composite structure may be determined considering the width of the carbonaceous sheet forming the first carbonaceous pocket and/or the thickness of the second carbonaceous pocket, but may not be limited thereto.

For example, the pliable carbonaceous pocket composite structure may have a size of from nanometer to micrometer or more, but may not be limited thereto. For example, the size of the pliable carbonaceous pocket composite structure is not particularly limited and may be regulated by the size of the carbonaceous nanosheet forming the pliable carbonaceous pocket composite structure and laminating of the composites. For example, the pliable carbonaceous pocket composite structure may have a size of about 100 µm or less, about 10 µm or less, about 1 µm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 µm, from about 10 nm to about 50 µm, from about 10 nm to about 10 µm, from about 10 nm to about 1 µm, from about 10 nm to about 500 nm, from about 10 nm to about 100 nm, from about 100 nm to about 100 µm, from about 100 nm to about 50 µm, from about 100 nm to about 10 µm, or from about 100 nm to about 1 µm, but may not be limited thereto.

In an exemplary embodiment of the present disclosure, the pliable carbonaceous pocket composite structure may have excellent dispersive property in a solvent. For example, the pliable carbonaceous pocket composite structure may have excellent dispersive property in various organic solvents such as water, alcohols, organic solvents, and the like, and the pliable carbonaceous pocket composite structure has remarkably excellent dispersive property as compared to carbonaceous materials such as graphene and thus can be easily applied to manufacturing of electrodes or various devices.

Hereinafter, the present disclosure will be explained in more detail with reference to Examples and the drawings. However, the following Examples and drawings are illustrative only for better understanding of the present disclosure but do not limit the present disclosure.

MODE FOR CARRYING OUT THE INVENTION

EXAMPLES

<Chemicals Used>

All reagents unless being specified were used as obtained from commercial sources (Junsei, Henkel, Graphene Supermarket, US Research Nanomaterials, Inc., Angstron Materials and Duksan) and were used without a purification. Specifically, silicon nanoparticles (particle size: from 30 nm to 50 nm, 98+%) were purchased from Nanostructured & Amorphous Materials, Inc. Potassium hydroxide (KOH) was purchased from Junsei. Cyanoacrylate glue was purchased from Henkel. Graphene powder was purchased from Graphene Supermarket, US Research Nanomaterials, Inc., and Angstron Materials. Acetone and distilled water were purchased from Duksan. All chemicals were used as received in air.

<Synthesis of Graphene Pliable Pocket Including Nano-Silicon>

Graphene powder and silicon nanoparticles were mixed by specific weight ratio (1:9, 2:8, 3:7, and 4:6) in acetone using sonication. Then, the cyanoacrylate glue monomer was poured into the mixed solution and shaken several time by hand very immediately. At that time, the amount of cyanoacrylate glue monomer was controlled according to the amount of graphene and acetone used. The glue monomer was used in the same weight as the acetone and it was tens of times the weight of graphene. The cyanoacrylate glue monomer started the polymerize reaction in a few seconds, and the reaction ended within one minute.

After the reaction, the mixture of the polymerized cyanoacrylate, graphene and silicon was dried in a 60° C. vacuum oven for less than 30 minutes. The fully cured mixture was crushed to a suitable size for milling with a hammer and transferred into a vial for a ball milling machine (8000M Mixer/Mill, SPEX SamplePrep). A 10-minute ball milling was run and powder of the mixture was obtained. The obtained powder was etched in a 1 M potassium hydroxide (KOH) solution for less than 1 min. At this stage, the etched powder is called Si_ECA_G. The etched powder was heat-treated in a $H_2$ and Ar atmosphere under 673 K for 30 minutes using a well-sealed tube furnace. Following the above process, the pliable carbonaceous pocket composite structure, Si_GPP, was obtained.

<Characterization>

1. FE-TEM (Field Emission-Transmission Electron Microscopy)

For the TEM observation (Titan cubed G2 produced by FEI company), Si_GPP was dispersed with the acetone solvent and put on a Cu mesh grid. An energy dispersive spectrometer (EDS) attached to the TEM was used to obtain the local elemental information and the elemental mapping.

2. FE-SEM (Field Emission-Scanning Electron Microscope)

For the SEM observation (Magellan 400 produced by FEI, SU8230 produced by Hitachi), Si_GPP and Si_ECA_G were dispersed with the acetone solvent and dropped on a small piece of a silicon wafer. The back scattered electron (BSE) detector attached to the SEM was also used to obtain the image of silicon particle distinguished. Sample preparation for observation of Si_GPP cross-section, 5 mg of Si_GPP was diffused into a Nafion 117 solution and then also dropped on the silicon wafer. An ion beam cross section polisher (IB09010CP, JEOL) was used to make a cross-section sample using ion beam.

3. XPS (X-Ray Photoelectron Spectroscopy)

The XPS spectra of Si_GPP and Si_ECA_G were obtained using a Sigma Probe of Thermo VG Scientific, which is equipped by a 350 W Al anode X-ray source along with a multi-anode, a pulse counting, and a hemispherical analyzer. The spectra were collected using an incident photon energy of 1486.6 eV and also corrected for the detector's work function.

4. XRD (X-Ray Diffraction Spectroscopy)

The powder X-ray data were collected using a SmartLab θ-2θ diffractometer in the reflectance Bragg-Brentano geometry employing a Johansson type Ge (111) monochromator filtered Cu Kα1 radiation at the 1200 W (40 KV, 30 mA) power and equipped with a high speed 1D detector (D/teX Ultra). The powders of the Si_GPP, silicon nanoparticle and pristine graphene were held in a holder stage and scanned by the scan speed of 2°/min in a continuous mode.

5. TGA (Thermogravimetric Analysis)

The weight portion of pure silicon in the Si_GPP samples were determined by using a TGA (TG209 F1 Libra, NETZSCH). Pyrolysis was measured when the Si_GPP was produced as the Si_ECA_G by heat treatment.

6. Raman Spectroscopy

The defect or distortion of carbon matrix in the Si_GPP and Si_ECA_G was observed by the Raman spectra, which were obtained using a high resolution dispersive Raman microscope (ARAMIS, HORIBA) equipped with an Ar ion CW Laser (514.5 nm).

7. MALDI (Matrix-Assisted Laser Desorption/Ionization)-TOF (Time-of-Flight) Mass Spectrometry The MALDI-TOF data were collected using a Bruker autoflex III (Bruker Daltonics). The molecular weight of polymerized ECA was measured by this analysis. For this measurement, Si_GPP was dissolved into $CHCl_3$ and a HCCA (α-cyano-4-hydroxycinnamic acid) matrix was used.

8. Characterizations of Electrochemical Properties

Electrochemical property of the half-cells:

The working electrodes for anodes were prepared by mixing the Si_GPP (80 wt %), carbon black (Super-P, 10 wt %), and poly (vinylidene fluoride) binder (PAA, 10 wt %) in N-methyl-2-pyrrolidone (NMP) to make a slurry. The slurry was pasted on a pure Cu foil using a doctor blade and dried in a vacuum oven at 70° C. overnight. The electrochemical performance of the prepared samples was investigated using a CR2032 type battery assembled in an argon-filled glove box with a pure lithium metal (Honjo Chemical Co.) as the counter/reference electrode. The 1 M of lithium hexafluorophosphate ($LiPF_6$) dissolved in co-solvents of ethylene carbonate (EC) and diethyl carbonate (DEC)/vinylene carbonate (EC/DEC/VC=1:1:0.02, v/v/v) was used as the electrolyte. The Celgard 2400 polypropylene was used as a separator.

The electrodes were cycled in a potential range of 0.01 V to 1.5 V (vs $Li/Li^+$) for Si nanoparticles or Si_GPP electrodes at room temperature using a battery cycler (Wonatech, WBCS-3000). Also, the electrodes for representative cathodes were prepared by mixing the cathode materials (94 wt %) such as lithium cobalt oxide ($LiCoO_2$, LCO), lithium manganese oxide ($LiMnO_2$, LMO), and lithium iron phosphate ($LiFePO_4$, LFP)), Super-P (3 wt %) and binder (PVDF, 3 wt %) in NMP to make a slurry. The slurry was pasted on a pure Al foil using a doctor blade and dried in a vacuum oven at 70° C. overnight.

The electrochemical performances of the representative cathodes materials were investigated using a CR2032 type battery assembled in an argon-filled glove box with a lithium metal as the counter/reference electrode. The electrolyte used was the 1 M $LiPF_6$ in 1:1 (v/v) ethylene carbonate/diethyl carbonate (EC/DEC) electrolyte. The Celgard 2400 polypropylene was also used as a separator. Charge-discharge measurements were performed under different current densities in a potential range of from 3 V to 4.5 V (vs. $Li/Li^+$).

Pre-Lithiation Process for the Si_GPP Electrode:

The Si_GPP electrode was assembled into a half-cell with Li metal as the counter/reference electrode and a separator. The cell was installed in a circuit for lithiation with a variable resistor and then lithiated for 30 min. The present inventors used a resistance of 100 ohm to control the lithiation speed and control the SEI formation during pre-lithiation. After pre-lithiation, the cell was disassembled and then fabricated to half-cell and full-cell configuration.

Fabrication and Evaluation of Full-Cells:

To evaluate the electrochemical performances of the Si_GPP/cathode and graphite/cathode devices in a full-cell configuration, the Si_GPP based full-cells using Si_GPP as the anode and the representative cathode materials (LCO, LMO, and LFP) and the graphite based full-cells using graphite as the anode and the representative cathode materials as the cathodes were fabricated using a coin-type cell. Before the fabrication, the Si_GPP electrode was pre-lithiated to obtain the maximized initial Coulomb efficiency for preventing the Li ion loss during operation.

After the pre-lithiation of anodes, the anodes and cathodes were configured to full-cells. The 1 M $LiPF_6$ dissolved in co-solvents of ethylene carbonate (EC) and diethyl carbonate (DEC) (v:v=1:1) with 5 wt % of FEC was used as the electrolyte and the Celgard 2400 polypropylene was used as a separator. According to the charge balance between electrodes, the masses of two electrodes should be adjusted to equalize the total charge and the excessive 10% mass of anode materials should be considered in the present Example. For example, the mass ratio of LFP to the Si_GPP was determined to be 9.72. The total mass of active material on the anode was 1.4 mg cm$^{-2}$ while that on the LFP was 13 mg cm$^{-2}$. The CV and gravimetric charge/discharge data at various scan rates were measured using a multichannel potentiostat (Biologic, VSP). Also, the energy density of full-cells (E.D, Wh kg$^{-1}$) was calculated using the following relationship of E.D=$(C_A \times C_C)/(C_A+C_C) \times V$.

Herein, $C_A$ is the specific capacity of the anode electrode, $C_C$ is the specific capacity of the cathode electrode, and $V_n$ is the nominal potential of full-cells.

TABLE 1

The electrochemical properties of anodes, cathodes, and their full-cells

| Anode | Capacity (mAh/g) | Cathode | Capacity (mAh/g) | Mass ratio | Nominal voltage (V) | Energy density (Wh/kg) |
|---|---|---|---|---|---|---|
| Si_GPP | 1765 | LCO | 128.1 | 12.6 | 3.7 | 448.1 |
|  |  | LMO | 107.2 | 14.3 | 3.7 | 373.9 |
|  |  | LFP | 162.1 | 9.7 | 3.3 | 489.9 |
| Graphite (Comparative Example) | 343.9 | LCO | 128.1 | 2.8 | 3.7 | 335.7 |
|  |  | LMO | 107.2 | 3.2 | 3.7 | 291.6 |
|  |  | LFP | 162.1 | 2.2 | 3.3 | 363.6 |

In the present Example, the present inventors developed a new methodology for establishing the Si encapsulated carbon composites for high performance anodes materials and their full-cell configuration with a high energy density. The major fabrication process of this composite was completed in a few seconds, established by "Super glue" process, the dynamic polymerization of Ethyl Cyanoacrylate (ECA) contained in commercial "Super glue". By utilizing this method, commercial available Si particles were encapsulated in the pliable graphene pocket (GPP) with a thin inner layer graphene giving the conductivity and a thick outer carbon pocket stabilizing the SEI layers, leading a remarkable capacity retention under various current densities and robust cycle performances. The high performance anodes of Si-encapsulated GPPs also implement robust full-cells by pairing with representative cathodes. Moreover, various advantages of this "Super glue" process such as dynamic, scalable, easy, and cost-effective can realize a precise control of materials and a mass production for commercialization simultaneously.

FIG. 1C to FIG. 1G show the overall procedures for design of ultrafast scalable production of a pliable graphene pocket encapsulating Si nanoparticles and their validity of the scalable process. Specifically, FIG. 1C is a schematic diagram illustrating a process of preparing a graphene pliable pocket encapsulating Si nanoparticles using ECA: i) the polymerization of super glue (inset) with graphene and Si nanoparticles; ii) intermediate product (Si_ECA_G) (inset: ECA polymer clasps Si nanoparticle on graphene surface and interlayer preventing Si nanoparticle aggregation) after polymerization, ball-mill, and etching process; and iii) Si_GPP structure (inset: the diagram of internal phase in Si_GPP) after a heat treatment. FIG. 1D shows a 50 mL scale batch for Si_GPP fabrication: FIG. 1D (i) shows a polymerization step using Si nanoparticle of 466 mg, graphene of 200 mg, and ECA of 20 g (inset: a cross-section of polymerized ECA including graphene and Si nanoparticle); FIG. 1D (ii) shows a grinding step using a high energy ball mill that can make a few micro-sized ECA, Si, and graphene composite (inset: the amount of composite powder compared with a U.S. 50 cent coin); and FIG. 1D (iii) shows a final step of Si_GPP production, the amount of Si and graphene included in synthesized Si_GPP is perfectly the same as the amount of Si and graphene used in first step (inset: the amount of Si_GPP powder compared with a 50 cent coin). FIG. 1E (i)-(iii) show a 500 mL scale batch for Si_GPP fabrication using Si nanoparticles of 3.5 g, graphene of 1.5 g, and 150 g of ECA, respectively.

Figure 1G:
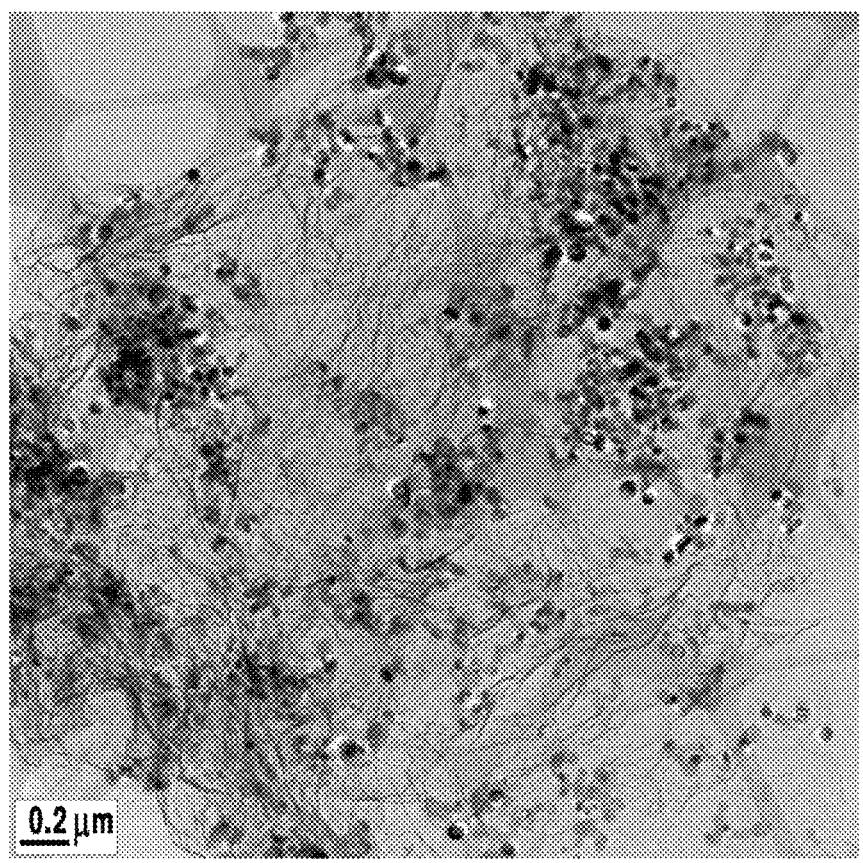
FIG. 1G is a TEM image of a pliable carbonaceous pocket composite structure in accordance with an example of the present disclosure.

FIG. 1F and FIG. 1G are TEM images of a pliable carbonaceous pocket composite structure in accordance with the present Example. As confirmed by the TEM images of the pliable carbonaceous pocket composite structure in FIG. 1F and FIG. 1G, each of the Si nanoparticles is encapsulated by the first graphene pocket (inner pocket) and the second graphene pocket is formed outside the first graphene pocket in the pliable carbonaceous pocket composite structure.

Figure 2A:
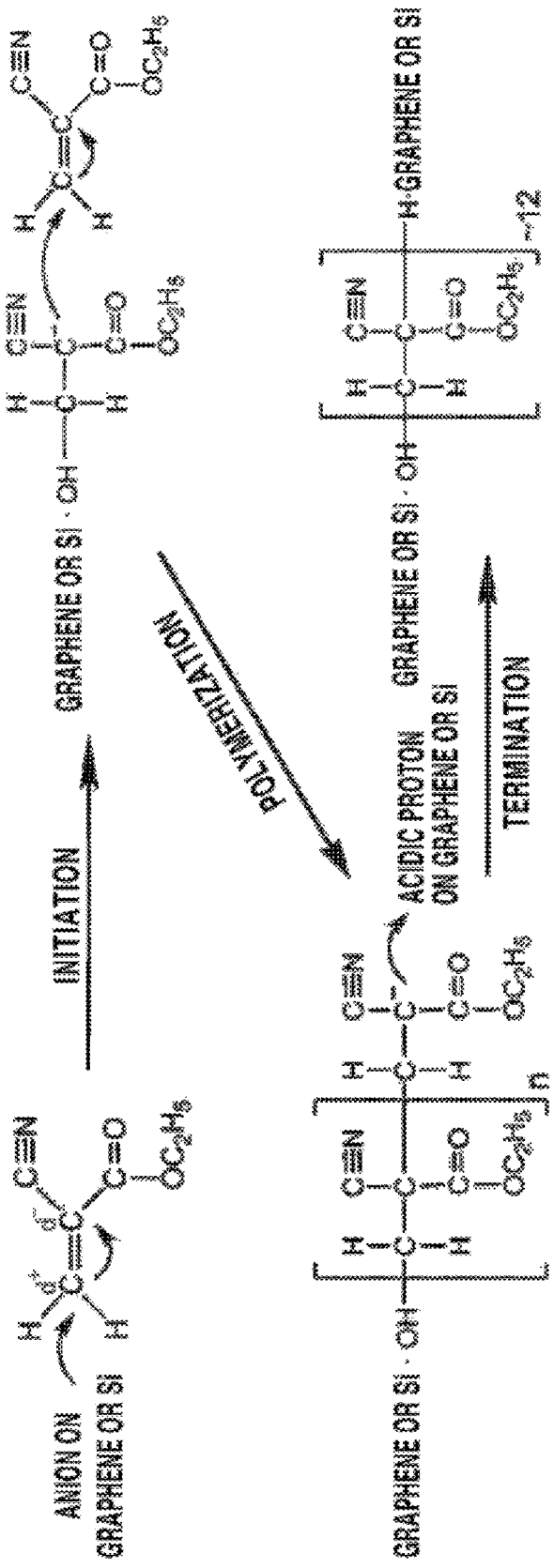
FIG. 2A is a schematic diagram illustrating anionic polymerization of ECA in the presence of graphene and Si nanoparticles in accordance with an example of the present disclosure.
Figure 2B:
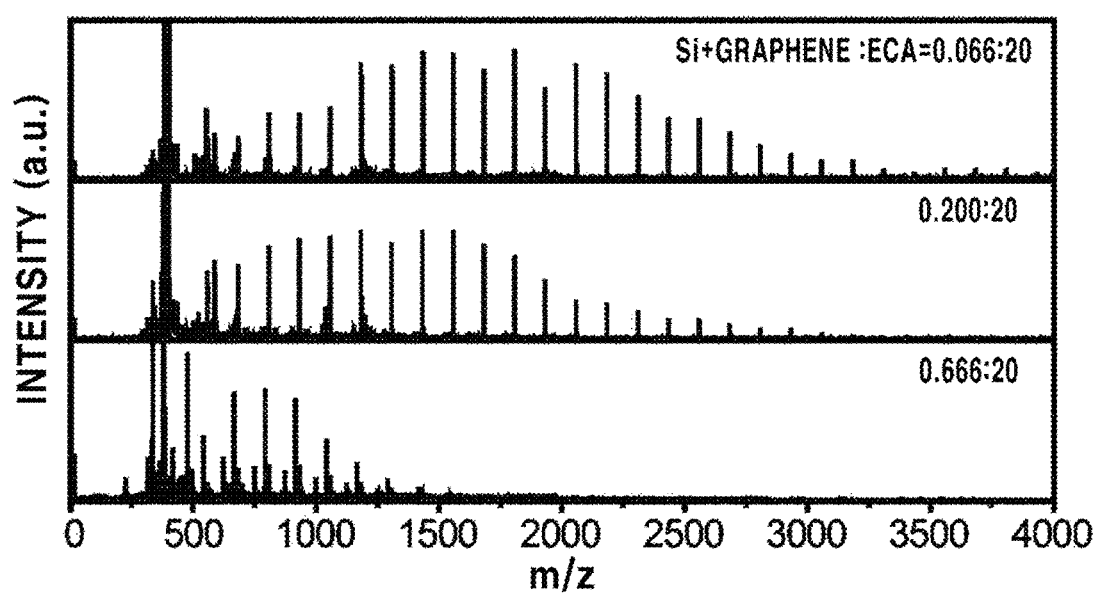
FIG. 2B shows MALDI-TOF spectra of poly ECA from condition of Si_ECA_G samples along contents ratio of graphene+Si nanoparticles: ECA during a polymerization process in accordance with an example of the present disclosure.

FIG. 2A is a schematic diagram illustrating anionic polymerization of ECA in the presence of graphene and Si nanoparticles in accordance with the present Example, and FIG. 2B shows MALDI-TOF spectra of poly ECA from condition of Si_ECA_G samples along contents ratio of graphene+Si nanoparticles: ECA during a polymerization process.

FIG. 3 shows the result of structural analyses of Si and graphene composites in accordance with the present Example, and FIG. 3A and FIG. 3B are SEM images of the Si_GPP, FIG. 3C shows the cross-section of the Si_GPP, FIG. 3D shows the cross-section of the Si_GPP with BSE mode, FIG. 3E is a TEM image of the Si_GPP, FIG. 3F is a STEM image of the Si_GPP, FIG. 3G is an elemental mapping image of the Si_GPP, and FIG. 3H is a high-resolution STEM image of Si nanoparticles in the Si_GPP.

Figure 4A:
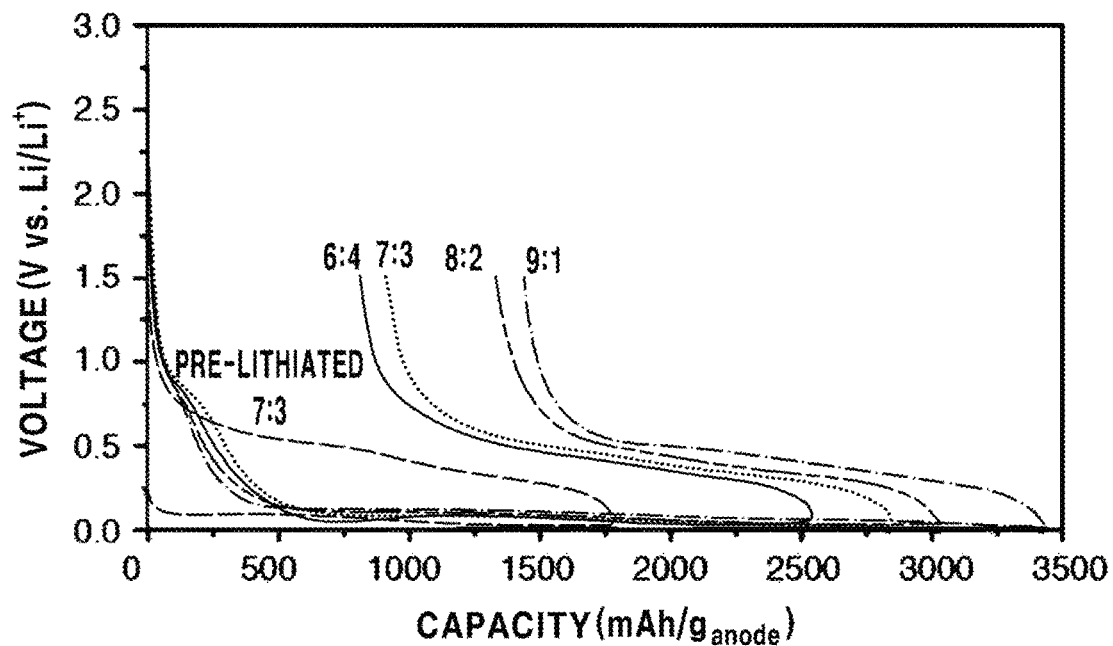
FIG. 4A shows the result of analysis of electrochemical performances of a Si_GPP half-cell in accordance with an example of the present disclosure and shows an initial charge-discharge profile of Si_GPP electrodes with various ratio silicon contents and pre-lithiation conditions.
Figure 4B:
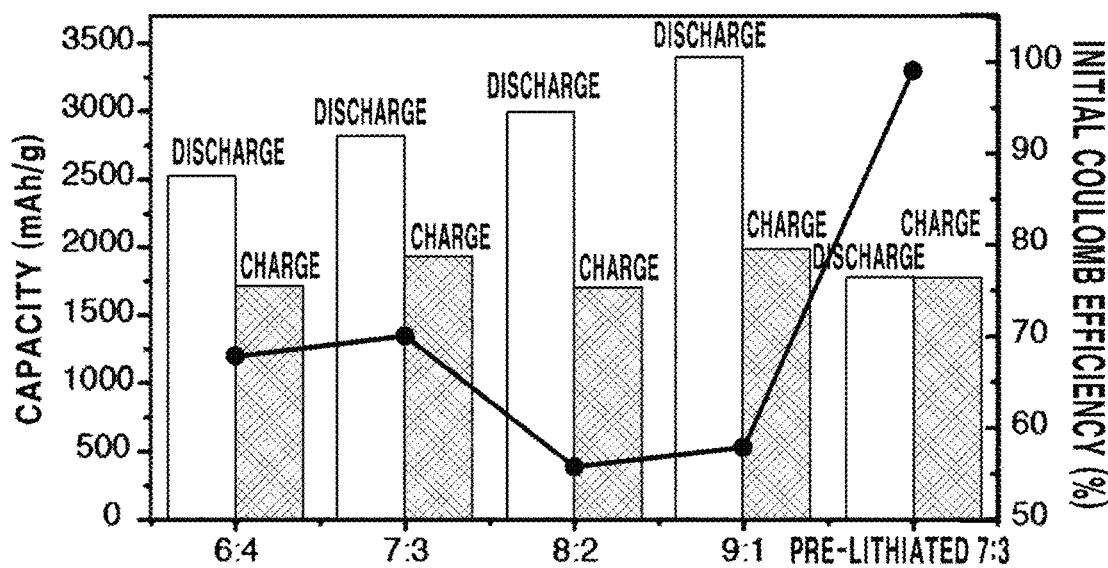
FIG. 4B shows the result of analysis of electrochemical performances of a Si_GPP half-cell in accordance with an example of the present disclosure and shows the result of comparison of the specific capacity and initial Coulomb-efficiency of Si_GPP electrodes with various preparation conditions.
Figure 4C:
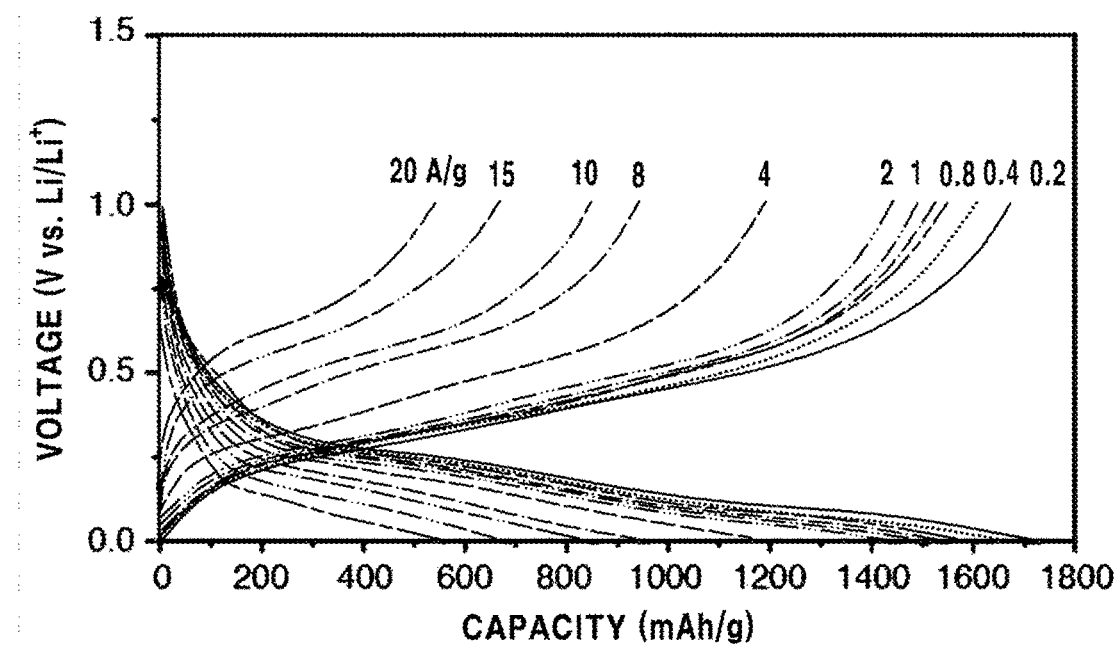
FIG. 4C shows the result of analysis of electrochemical performances of a Si_GPP half-cell in accordance with an example of the present disclosure and shows voltage profiles for the 7:3 Si_GPP as a function of various current densities from 200 mA/g to 20 A/g.
Figure 4D:
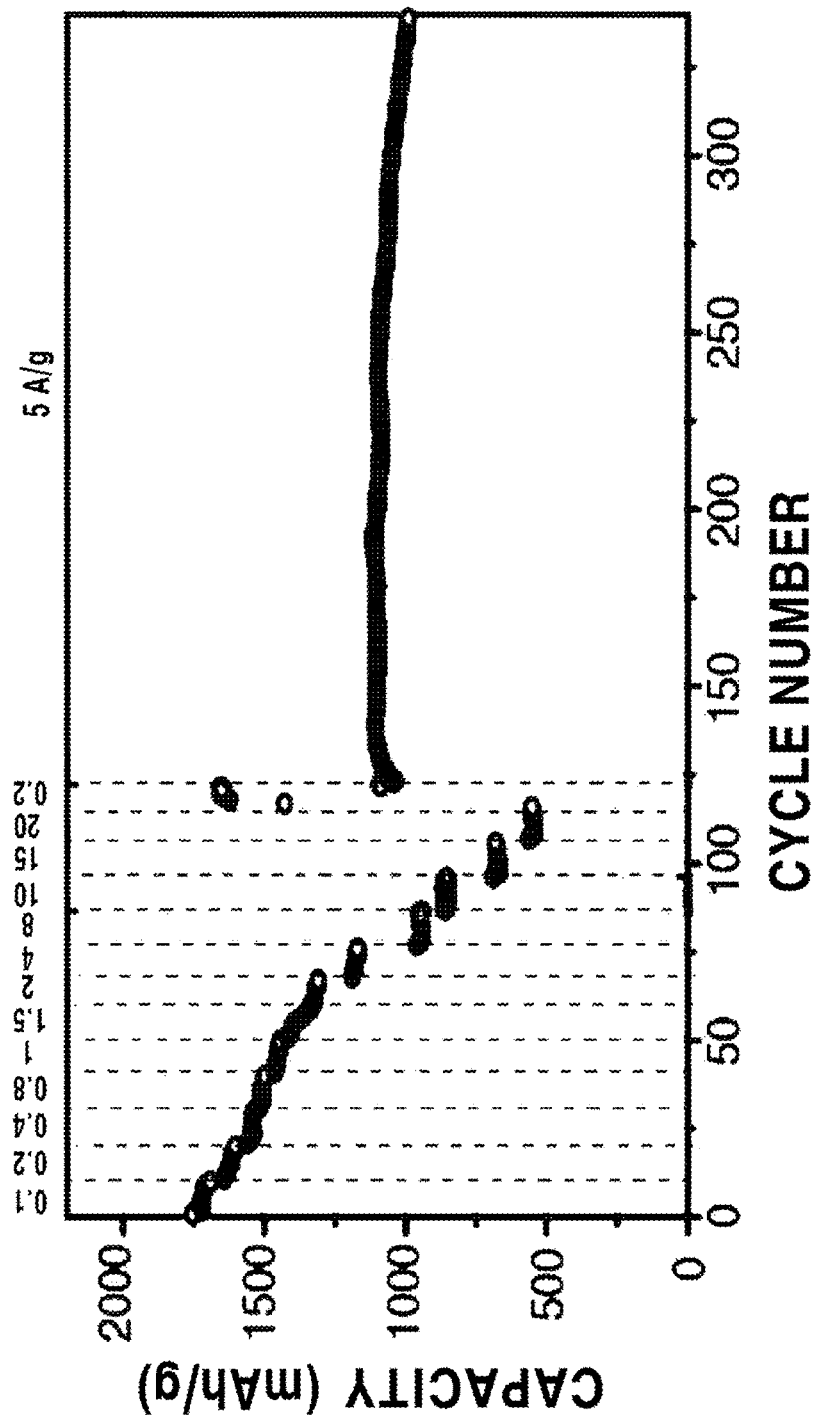
FIG. 4D shows the result of analysis of electrochemical performances of a Si_GPP half-cell in accordance with an example of the present disclosure and shows the result of analysis of capacity retention at various current densities from 0.1 A/g to 20 A/g and cycle performances at 5 A/g after capacity retention.

FIG. 4A to FIG. 4D show the result of analysis of electrochemical performances of a Si_GPP half-cell in accordance with the present Example, and FIG. 4A shows an initial charge-discharge profile of Si_GPP electrodes with various ratio silicon contents and pre-lithiation conditions and FIG. 4B shows the result of comparison of the specific capacity and initial Coulomb-efficiency of Si_GPP electrodes with various preparation conditions. FIG. 4C shows voltage profiles for the 7:3 Si_GPP as a function of various current densities from 200 mA/g to 20 A/g and FIG. 4D shows the result of analysis of capacity retention at various current densities from 0.1 A/g to 20 A/g and cycle performances at 5 A/g after capacity retention.

Figure 5A:
FIG. 5A is a schematic diagram of full-cell configuration and FIG. 5B shows voltage profiles of cathodes and anodes at half-cell configuration.
Figure 5B:
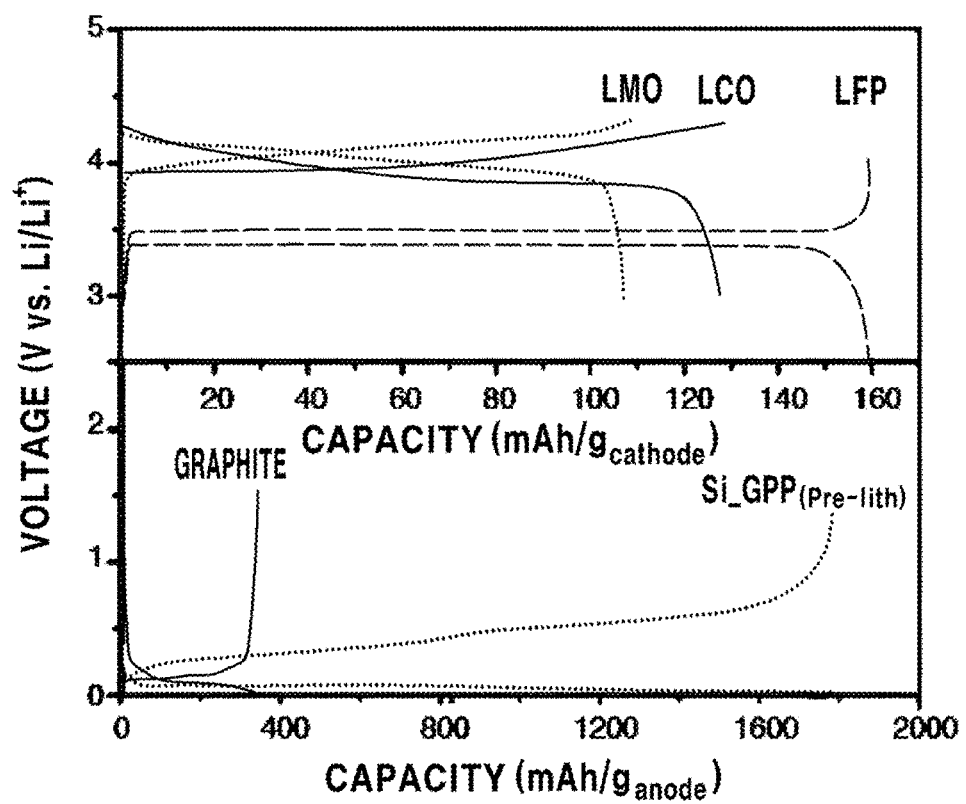

FIG. 5 shows the result of analysis of electrochemical performances of a full-cell with Si_GPP and representative commercial anodes as Comparative Examples in accordance with an example of the present disclosure, and FIG. 5A is a schematic diagram of full-cell configuration and FIG. 5B shows voltage profiles of cathodes and anodes at half-cell configuration. FIG. 5C shows voltage profiles of full-cell configuration with a Si_GPP anode and various cathodes and FIG. 5D shows cycle performances of full-cells using Si_GPP with LCO, LMO, and LFP. FIG. 5E is a graph showing comparison of energy densities of full-cells using Si_GPP and graphite as the function of cathode materials.

Figure 6A:
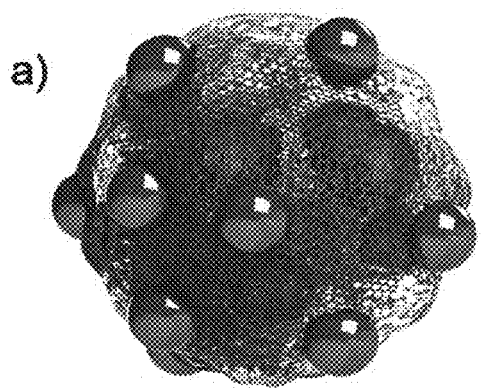
FIG. 6A is a schematic diagram of Si_ECA_G before base etching.
Figure 6B:
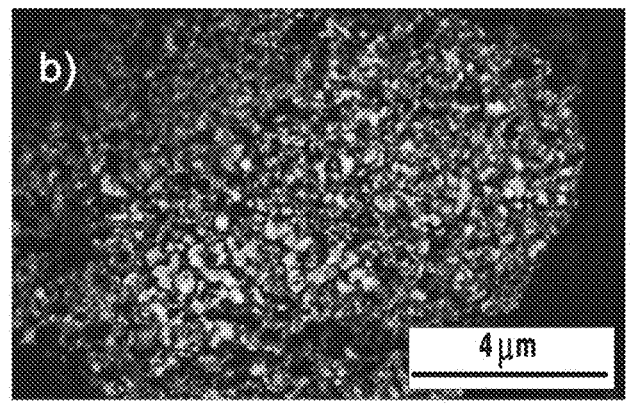
FIG. 6B is a BSE image of Si_ECA_G before base etching.
Figure 6C:
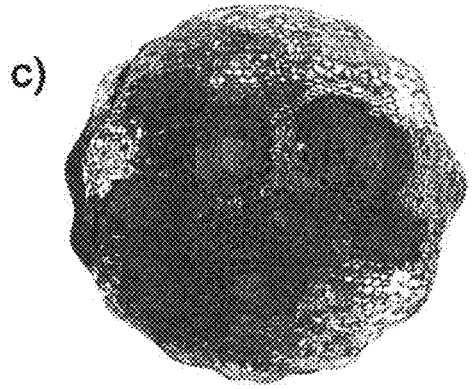
FIG. 6C is a schematic diagram of Si_ECA_G after base etching.
Figure 6D:
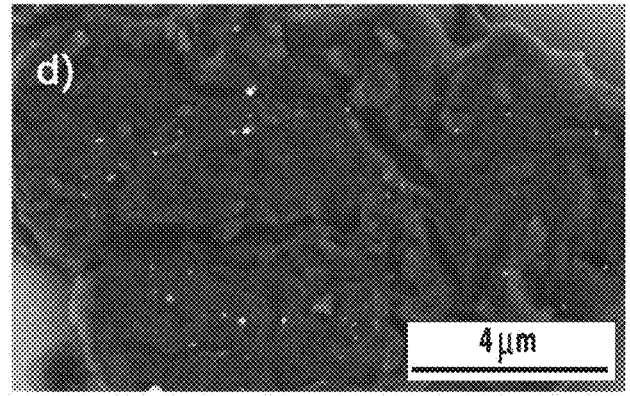
FIG. 6D is a BSE image of Si_ECA_G after base etching.

FIG. 6 shows schematic diagrams and back scattered electron (BSE) SEM images before and after base etching of Si_ECA_G, and FIG. 6A is a schematic diagram of Si_ECA_G before base etching, FIG. 6B is a BSE image of Si_ECA_G before base etching, FIG. 6C is a schematic diagram of Si_ECA_G after base etching, and FIG. 6D is a BSE image of Si_ECA_G after base etching.

Figure 7:
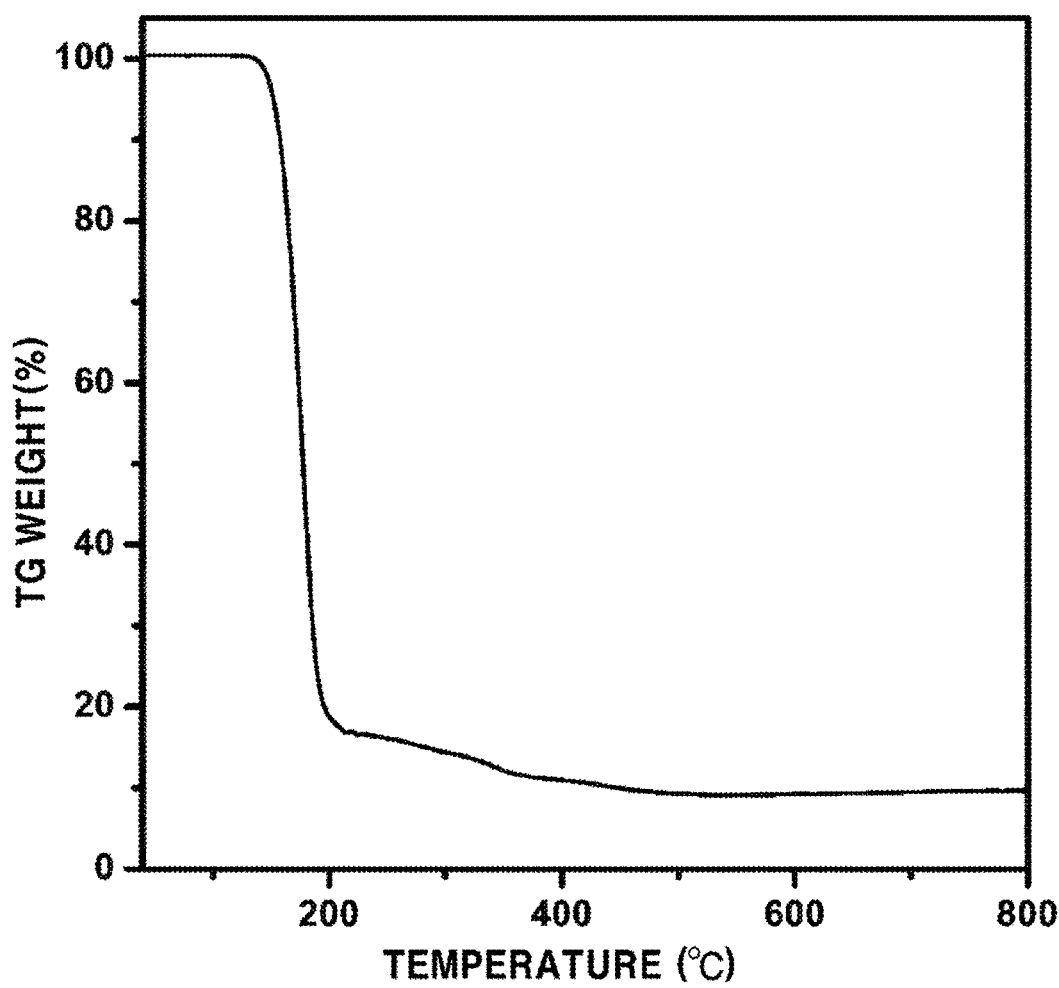
FIG. 7 shows the result of thermogravimetric analysis (TGA) of Si_ECA_G obtained by 10° C./min ramping rate under argon atmosphere in accordance with an example of the present disclosure.

FIG. 7 shows the result of thermogravimetric analysis (TGA) of Si_ECA_G obtained by 10° C./min ramping rate under argon atmosphere.

FIG. 8A and FIG. 8B are SEM images of mass-produced Si_GPP, FIG. 8C is a STEM image of the mass-produced Si_GPP, and FIG. 8D and FIG. 8E are STEM elemental mapping images of the mass-produced Si_GPP (Blue: Carbon, Red, Silicon).

In the present Example, to encapsulate every Si particle with graphene as the inner carbon materials in a durable outer carbon pocket, Ethyl Cyanoacrylate (ECA) called as the "Super glue" was selected for generating the very dynamic polymerization instantly. Commercial available Si nanoparticles and ratio controlled graphene were well dispersed in a solvent and mixed with ECA (FIG. 1A-i). During the dynamic polymerization of ECA in the solvent, Si nanoparticles were captured in a polymer matrix composed of ECA and graphene sheets (FIG. 1A-ii) and clasped individually by a surface or interlayer of graphene. According to experiments, graphene was able to cure ECA at least 100 times the weight in a few seconds. In addition, the polymerization reaction of ECA is an exothermic reaction, and the solvent carrying graphene and Si nanoparticles can be almost evaporated during the curing. Due to this fast curing reaction of ECA, a re-agglomeration of graphene sheets and Si nanoparticles can be prevented in the ECA polymer matrix.

Consequently, the polymerized ECA was capturing graphene sheets and Si nanoparticles were captured in the matrix of ECA polymer and their separated structure could be preserved during further procedures. The ECA polymer could preserve the homogeneity of graphene sheets/Si nanoparticles mixture even after the subsequent procedures such as the mechanical ball-milling process to obtain the micro-sized structures and the washing process to remove the exterior Si by a concentrated base solution. After the followed procedure, the intermediate products (Si_ECA_G) have a pocket type structure with the mixture of graphene sheets and ECA polymer, as shown in scanning electron microscopy (SEM) images of Si_ECA_Gs in FIG. 6. The ball-milled composite had a spherical shape and their average size was less than 20 μm.

As confirmed by a back scattering electron (BSE) mode image of SEM in FIG. 6B, Si nanoparticles in Si_ECA_Gs were uniformly stuck in the raisin bread like ECA/graphene matrix. The brighter parts representing the Si nanoparticles were uniformly distributed in the ECA_G matrix. After an etching process to remove the residual Si nanoparticles outside Si_ECA_G, Si nanoparticles were not detected on the surface of the Si_ECA_G and small holes on the surface were detected due to missing Si nanoparticles from the surface (FIG. 6D).

After removing the ECA by annealing the Si_ECA_G, Si_GPP which is a final product of this process was obtained. The ECA matrix in the Si_ECA_Gs was easily removable by evaporating under annealing conditions (90% evaporated at 200° C., 10% evaporated at 350° C. in Argon). During the ECA evaporation, graphene sheets were shrinking on Si nanoparticle clusters (FIG. 1A-ii inset) and the residual graphene sheets were building up the thick carbon pocket containing Si nanoparticle clusters captured by the inner graphene sheets (FIG. 1A-iii). The Si nanoparticles captured in a graphene pliable pocket with internal carbon shell (Si_GPP) for anode material was obtained after the fabrication process.

The whole manufacturing process took around 1 hour for Si_GPPs preparation because of the instant polymerization of ECA, which can introduce a scalable mass production by extending a scale of batch. To demonstrate the extendibility of this method to the scalable process, a 10 times larger batch was prepared and compared with the normal sized sample batch (50 mL). Comparing FIG. 1 and FIG. 1C, the processes of Si_GPP synthesis were not affected by the quantity of raw materials. Especially, the instant polymerization process was perfectly completed even at the 10 times larger massive production, comparable quality with 50 mL batch size (FIG. 1 and FIG. 1C insets). Moreover, the yield of Si_GPP products was preserved at the large scale process, as shown in the SEM and TEM images (FIG. 8) of Si_GPPs from massive production.

As ECA glue was poured into a solvent in which graphene and Si particles were well dispersed, the whole ECA monomer was polymerized to the ECA polymer instantly (in seconds). The ECA monomer was very explosively polymerized when exposed humid environment, and just trace amount of moisture triggers the immediate anionic polymerization of ECA. By this reaction, a relatively large amount of moisture remained on the surface of graphene and Si nanoparticles, through which the ECA was polymerized within a few seconds (FIG. 2A). During the above-described polymerization process, ECA was very instantly cured because of monomer of ECA could react with abundant anion from the graphene and Si nanoparticles in a flash and polymerization was quickly terminated when meeting plentiful acidic proton. From that reason, poly ECA in Si_ECA_G has a relatively smaller molecular weight than that of slowly cured polymers.

From FIG. 2B, the present inventors recognized that the amount of the graphene and Si nanoparticles in polymerizing affect the degree of ECA polymerization. When a smaller amount of graphene and Si nanoparticles was put into the same size of batch, a curing time was extended and polymerization was more progressed. The degree of polymerization was a huge influence on glass transition and liquefaction of polymerized ECA, and a lower molecular weight polymer could be rubberized and melted at lower temperatures. The molecular weight of ECA containing Si_ECA_G is less than 1500 m/z. Considering the unit molar mass of ECA (125.13 g/mol), it could be seen that the polymer consists of 12 or less chains. It is notable that the polymer having such a molar mass can be easily transformed to the glass transition and liquefaction.

The poly ECA, which was located in the space between the graphene and Si nanoparticles in the Si_ECA_G (FIG. 2C (i)), was modified into a viscoelastic state like a glue at around 150° C. (FIG. 2C (ii)). Over 150° C., the ECA polymer started to evaporate and graphene encapsulated Si nanoparticles by direct contact (FIG. 2C (iii)). Completing removing the ECA polymer, graphene sheets formed the inner carbon shell components capsulizing Si nanoparticles (FIG. 2C (iv)) and other residual graphene sheets established the outer carbon pocket which prevents the volume expansion of Si nanoparticle clusters during lithium charge/discharge operation (FIG. 1A (iii)). The present inventors noted that the number of ECA polymer chains controlled by the "Super glue" process can play a role as the key to achieve the homogeneous Si capsulation by graphene sheets during very fast ECA polymerization.

As the "Super glue" process suggested in the present Example, the Si_GPP preparation with instant polymerization for covering Si nanoparticles with inner and outer carbon pocket is a promising methodology for the commercially available Si based anode materials to LIBs. To characterize the Si_GPP in various preparation conditions, the morphology of Si_GPP was measured by the SEM and transmittance electron microscopy (TEM).

As shown in SEM images in FIG. 3A, less than 10 μm sized sphere shaped Si_GPP was observed with a uniform size and shape distribution. The individual Si_GPP showed a spherical shape with carbon warping on the surface (FIG. 3B). Si nanoparticles were not detected on the surface of Si_GPP. To verify the Si nanoparticles in a carbon pocket, the inside of the Si_GPP was observed by SEM analysis of the cross-section of Si_GPPs (FIG. 3C and FIG. 3D). As the cutting plane of the Si_GPP, the thin layers of graphene sheets were placed in the thick outer pocket shell composed of graphene sheets (FIG. 3C). The BSE mode observation showed that the entire Si nanoparticles were covered by thin layer graphene sheets and encapsulated by a thick carbon outer pocket (FIG. 3D). FIG. 3E shows the TEM observation of a Si_GPP single particle. The dark parts representing the Si nanoparticles were detected in the outer carbon shell. Because of the micron size of the Si_GPP, only the subsurface Si particles were detected by TEM analysis. The distribution of Si nanoparticles in the GPP was distinguished by scanning transmission electron microscopy (STEM) analysis (FIG. 3F) and elemental mapping of the Si_GPP (FIG. 3G) showed the Si elements distribution (red) in the carbon element GPP (blue). FIG. 3H shows a high-resolution STEM image of Si nanoparticles located in deep inside of the GPP.

Figure 9:
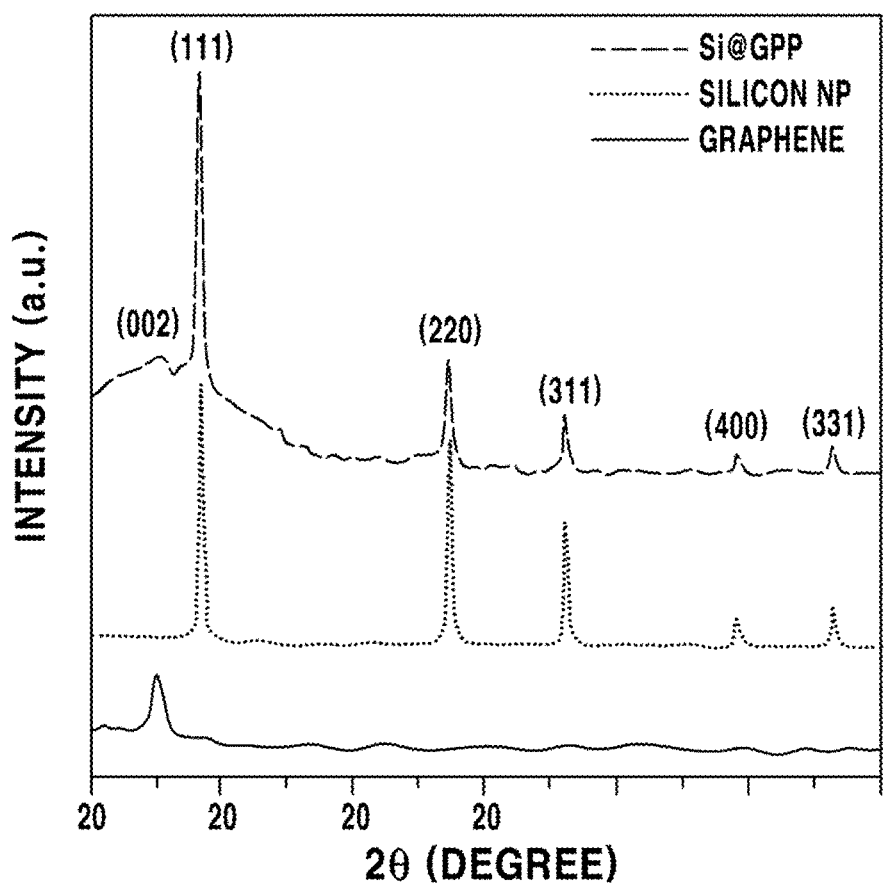
FIG. 9 shows X-Ray diffraction analysis (XRD) patterns of Si_GPP, silicon nanoparticle and graphene in accordance with an example of the present disclosure.

The results of STEM and element mapping analysis were also consistent with the X-Ray diffraction analysis (XRD), Raman spectroscopy, and X-ray photoelectron spectroscopy (XPS). The spectra of Si and amorphous carbon diffraction patterns were observed in XRD analysis (FIG. 9).

Figure 10:
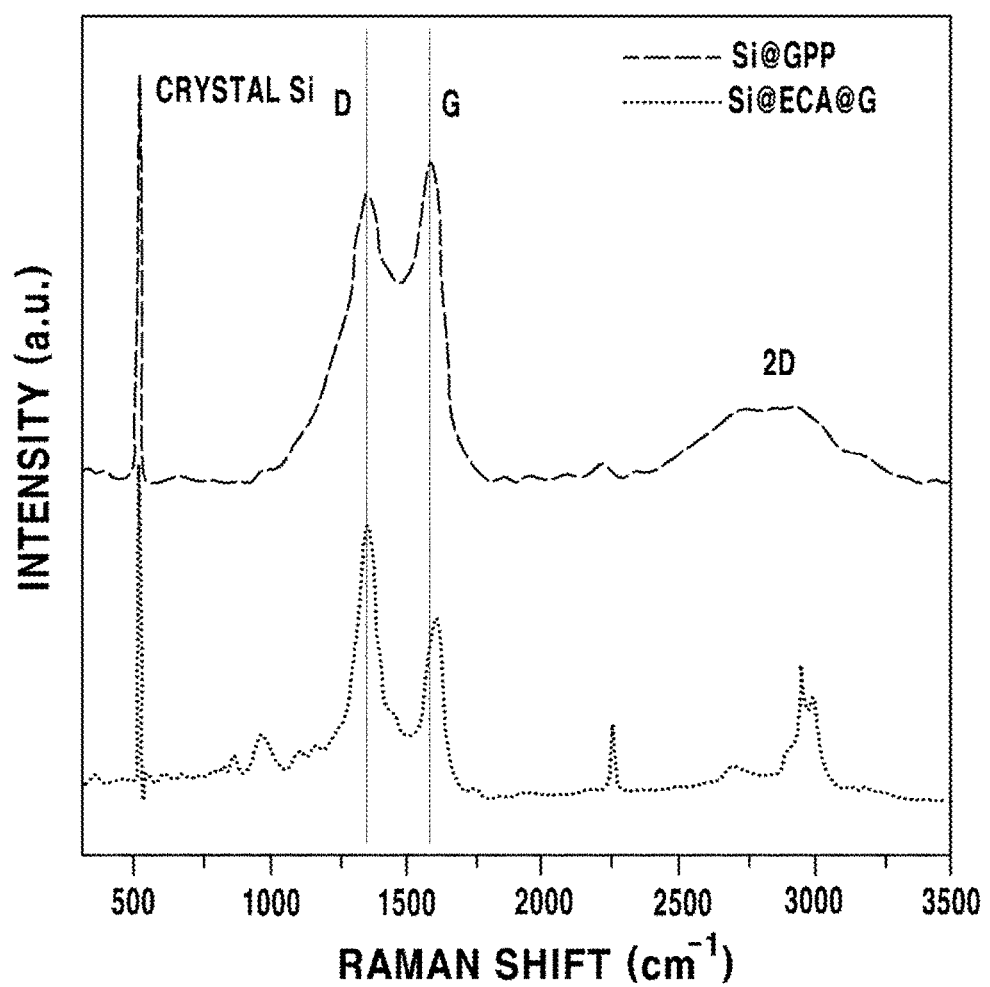
FIG. 10 shows Raman spectra of Si_GPP and Si_ECA_G in accordance with an example of the present disclosure.

The Raman spectra of the Si_GPPs displayed a main peak at around 512 $cm^{-1}$ indicating the Si crystalline nanoparticles, and another two peaks at around 1350 $cm^{-1}$ and 1598 $cm^{-1}$ representing the D and G band of graphene, respectively (FIG. 10).

Figure 11:
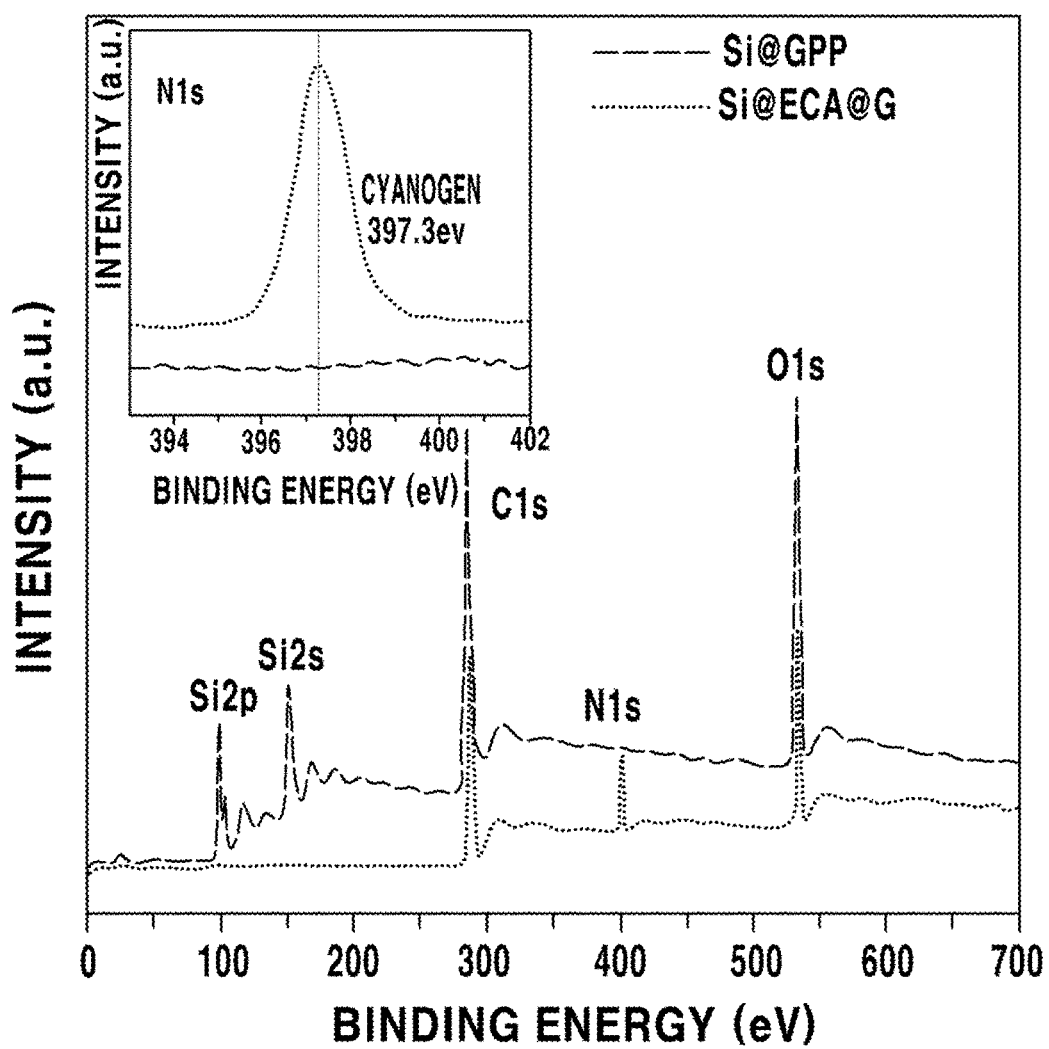
FIG. 11 shows X-ray photoelectron spectroscopy (XPS) analysis of Si_GPP and Si_ECA_G and N1s spectra (inset) from cyanogen in ECA in accordance with an example of the present disclosure.
Figure 12:
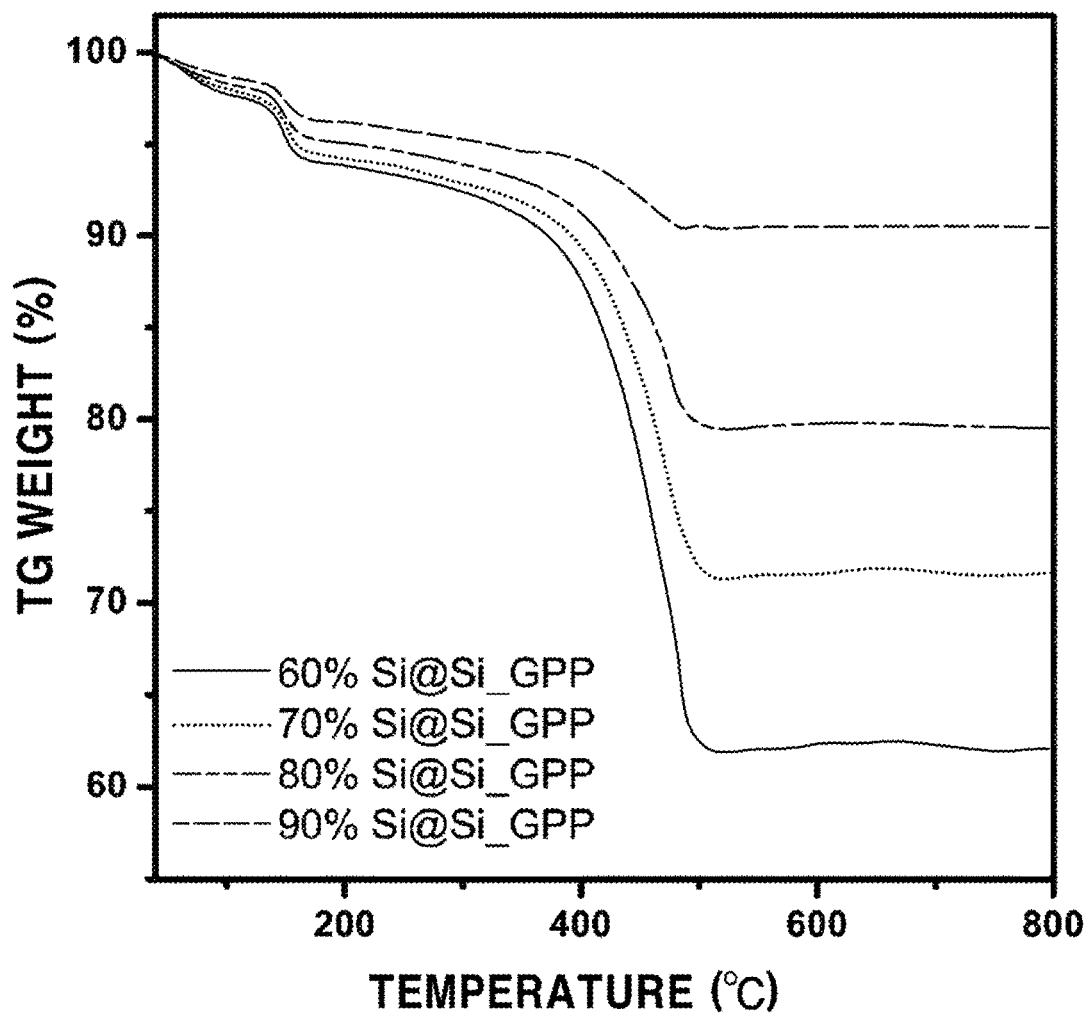
FIG. 12 shows the result of thermogravimetric analysis (TGA) measurements of silicon nanoparticles in Si_GPPs depending on the input of silicon in accordance with an example of the present disclosure.

This result indicates that the Si and graphene sheets were combined as the Si_GPP composites, and graphene sheets were not damaged during the manufacturing process. Slightly shifted 2D peak (2700 $cm^{-1}$) of Si_GPP is manifest graphene shrinkage evolved from the evaporation of ECA. Moreover, the ECA evaporation can be confirmed by the X-ray photoelectron spectroscopy (XPS) analysis, which shows the N1s spectra from cyanogen in ECA disappear after the ECA evaporation (FIG. 11). The contents of Si in Si_GPPs is confirmed by thermogravimetric analysis (TGA) measurements (FIG. 7), which shows the various ratio of Si nanoparticles in Si_GPPs from 60% to 90% as the Si input.

The zeta-potential of Si_GPP according to the present Example was measured using water as a diluent, and the zeta-potential of the Si_GPP was measured as −36.36 mV, and the zeta-potential of graphene according to Comparative Example was measured as 7.39 mV. The increase in zeta-potential of the Si_GPP indicates that the Si_GPP can maintain a dispersed state for long time if it has a remarkably high dispersibility in a solvent such as water, as compared with graphene.

The electrochemical performance of Si_GPP was tested to investigate the effects of the composite structure as an LIB anode. The Si_GPP electrodes were assembled into half-cell configuration with the Li metal as the counter and reference electrodes. To optimize the Si ratio in Si_GPPs, various Si_GPPs with different Si contents from 60% to 90% were prepared and their first charge and discharge operation was tested under from 0.01 V to 1.5 V (vs. Li/Li+) with a current density of 100 mA/g. FIG. 4A shows the initial charge and discharge profiles of Si_GPPs with different Si ratio. Every Si_GPP electrode displays the representative Si alloying plateau under 0.1 V (vs. Li/Li+) and dealloying around 0.4 V. The alloying/dealloying peaks of Si_GPPs from the cyclic voltametric measurement show the representative Si based electrodes (FIG. 13) and are consistent with voltage profile of Si_GPP electrodes in FIG. 4A. Due to the irreversible reaction at the first discharging by formation of SEI layers, the initial Coulomb efficiency (ICE) did not reach 80%, but the irreversible reaction at first discharge clearly disappeared after the pre-lithiation.

Summarizing the capacity of initial charge/discharge, the irreversible charge/discharge capacities were optimized along the Si contents, and 7(Si):3(carbon) weight ratio (7:3) showed the highest ICE of 70% (FIG. 4B). Even at the high contents Si in Si_GPP structure such as 90% weight ratio (9:1), the ICE is degraded due to the irreversible reaction of $SiO_2$ surfaces on the commercial Si nanoparticles. The 7:3 sample was selected as the further work for evaluating the electrochemical performances as the anode electrodes in half- and full-cell configurations.

Figure 13:
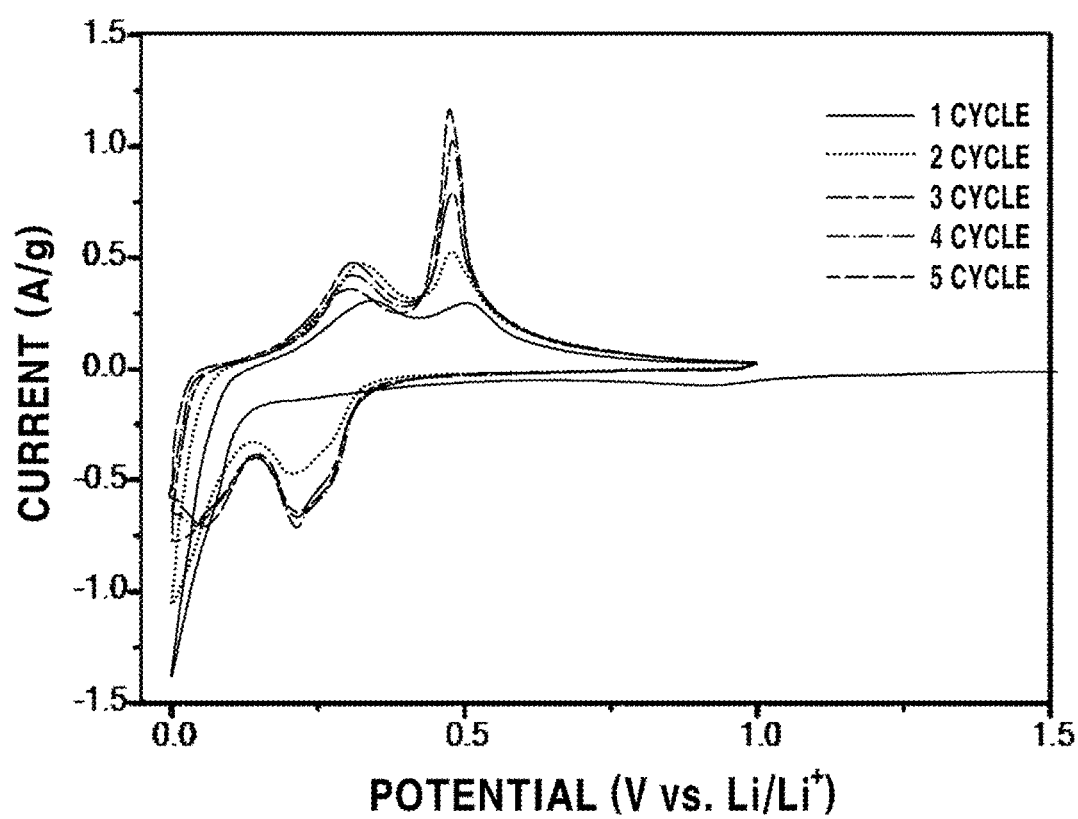
FIG. 13 shows the result of cyclic voltammetry of the Si_GPP 7:3 electrode in accordance with an example of the present disclosure.
Figure 14:
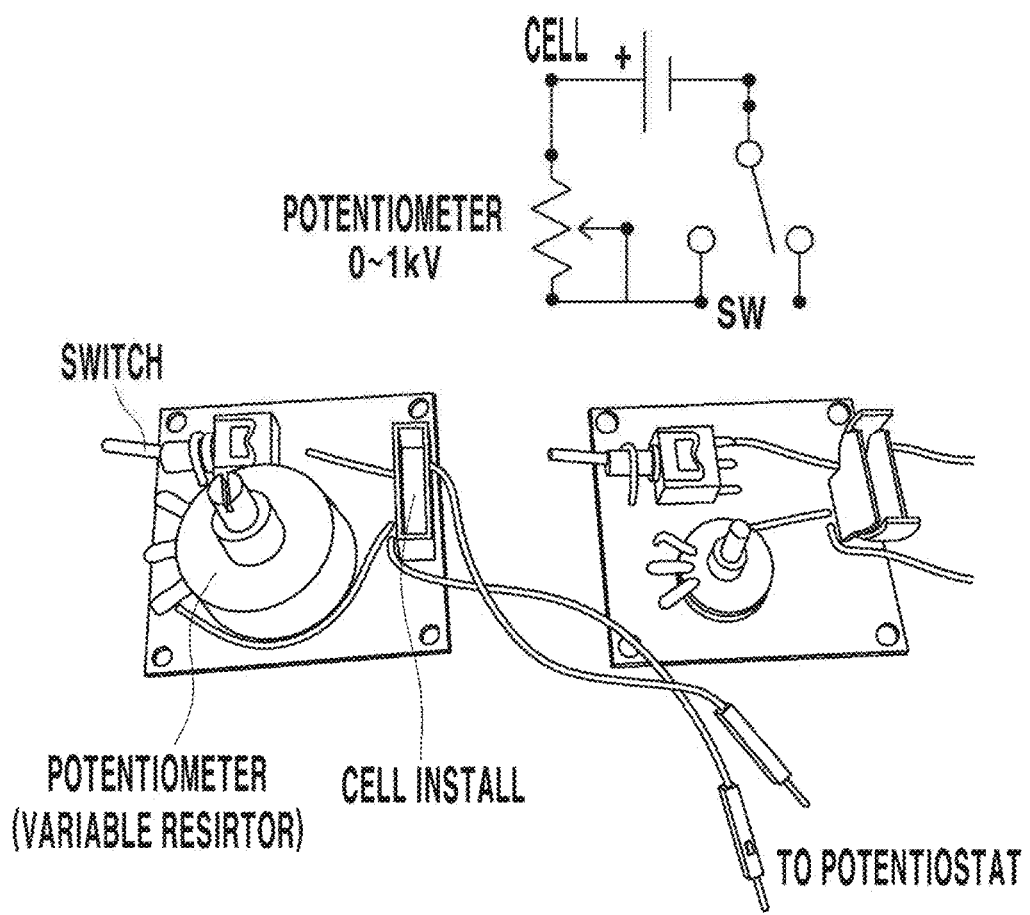
FIG. 14 shows a schematic diagram and a photo of the electric circuit for the pre-lithiation process in accordance with an example of the present disclosure.

To obtain the high ICE value for full-cell configuration in the present Example, the circuit for the pre-lithiation with 100 ohm resistance was designed to control the lithiation speed (FIG. 14) and 30 mins duration of pre-lithiation was applied. The irreversible reaction from the SEI layer formation and $SiO_x$ lithiation at first discharge was completed after the pre-lithiation (FIG. 4A), leading a 99.3% of ICE (FIG. 4B). The rate capabilities of 7:3 Si_GPP electrodes were evaluated under various current densities. FIG. 4C shows the voltage profile of the Si_GPP electrode at the current densities of from 0.2 A/g to 20 A/g. The specific capacity of 1700 mAh/g at a current density of 0.2 A/g is comparable to the capacity at 0.1 A/g. At the overall current densities, the voltage profiles are operated stably and the capacities of the Si_GPP electrode originate from the Si—Li alloying plateau, corresponding to the CV of Si_GPP (FIG. 13).

Figure 15:
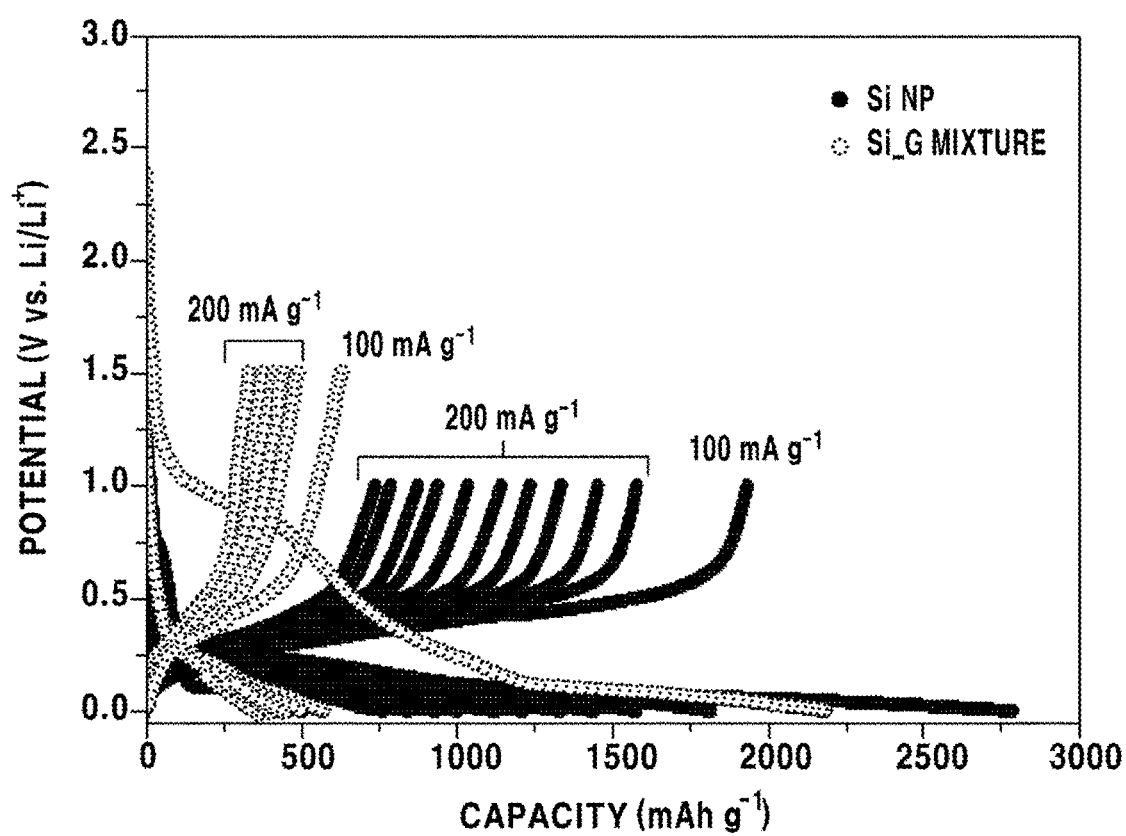
FIG. 15 shows charge-discharge profiles of silicon nanoparticles and silicon+graphene mixture (7:3 ratio, without GPP structure) in accordance with an example of the present disclosure.

Notably, the capacity of over 500 mAh/g still remained even at the high current density of 20 A/g. The properties of the Si_GPPs electrodes showed the high and stable specific capacities under evaluation of rate capabilities, cycled 10 times at each different current density (FIG. 4D). After the evaluation of rate capability, the Si_GPP electrode recovered the initial capacity of 1700 mAh/g at low rate operation (0.2 A/g) and showed the capacity retention of 82.9% or more during another 200 cycles at 5 A/g (FIG. 4D). To compare the electrochemical performances, the Si nanoparticles and the 7:3 (Si:graphene) mixture without GPP structure were prepared to evaluate the properties. The capacity retention of these electrodes without the GPP structure was highly degraded after only 5 cycle operation (FIG. 15). FIG. 15 shows charge-discharge profiles of silicon nanoparticles and silicon+graphene mixture (7:3 ratio, without GPP structure), and the first cycle was operated at a current density of 100 mA g$^{-1}$ and then, a current density of 200 mA g$^{-1}$ was applied to the electrodes. The Si nanoparticle showed unstable cycle properties while the Si_graphene mixture showed low specific capacity under repeated charge-discharge.

It is notable that the electrically interconnected Si nanoparticles with graphene inner sheets in GPP structure stimulate high performances under the overall current densities, and the thick outer carbon pocket structure of GPP plays a key role to achieve a stable cycle operation by protecting Si nanoparticles from the unstable SEI during long repeated charge/discharge.

Figure 5C:
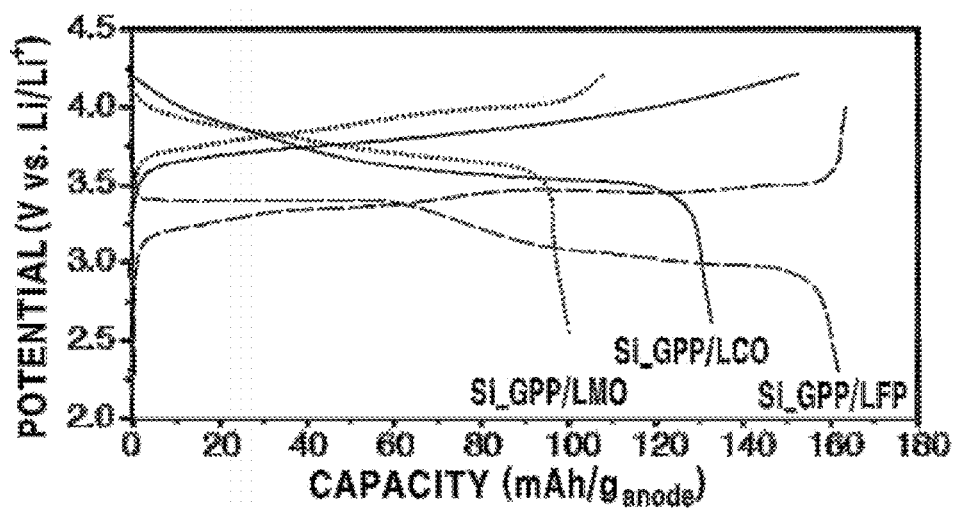
FIG. 5C shows voltage profiles of full-cell configuration with a Si_GPP anode and various cathodes and FIG. 5D shows cycle performances of full-cells using Si_GPP with LCO, LMO, and LFP.

To evaluate the validity of the Si_GPP electrodes, the full-cell configuration with representative cathode materials such as LiCoO$_2$ (LCO), LiMnO$_2$ (LMO), and LiFePO$_4$ (LFP) were tested and commercial graphite electrodes were also configured with cathodes (FIG. 5A). Before integration to the full-cells, each of the anodes and cathodes was tested in half-cell to check the electrochemical properties at 0.1 C rate (FIG. 5B). The mass ratios of anodes and cathodes for full-cell integration were confirmed by the specific capacities of anodes (pre-lithiated Si_GPP and graphite) and cathodes (LCO, LMO, and LFP, respectively) at 0.1 C rate. Full-cells configured with LCO, LMO, and LFP were operated at a current density of 10 mA/g (FIG. 5C).

Figure 5D:
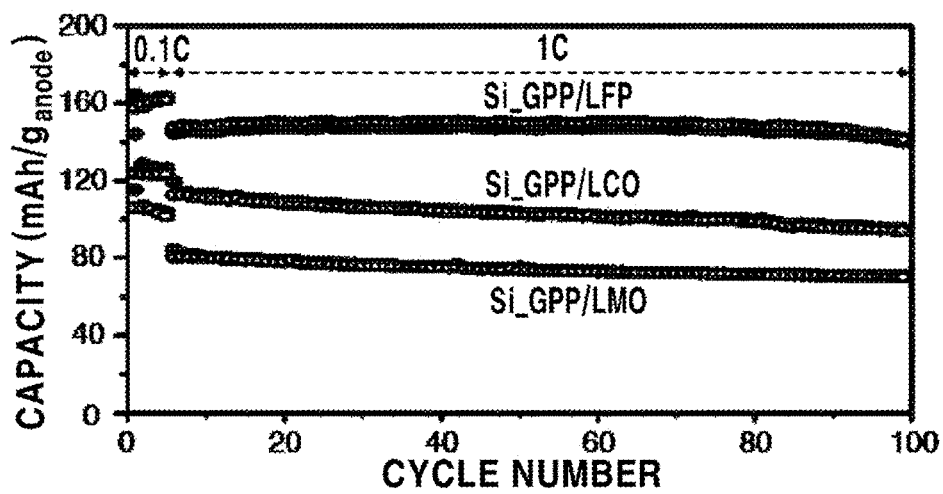
Figure 16:
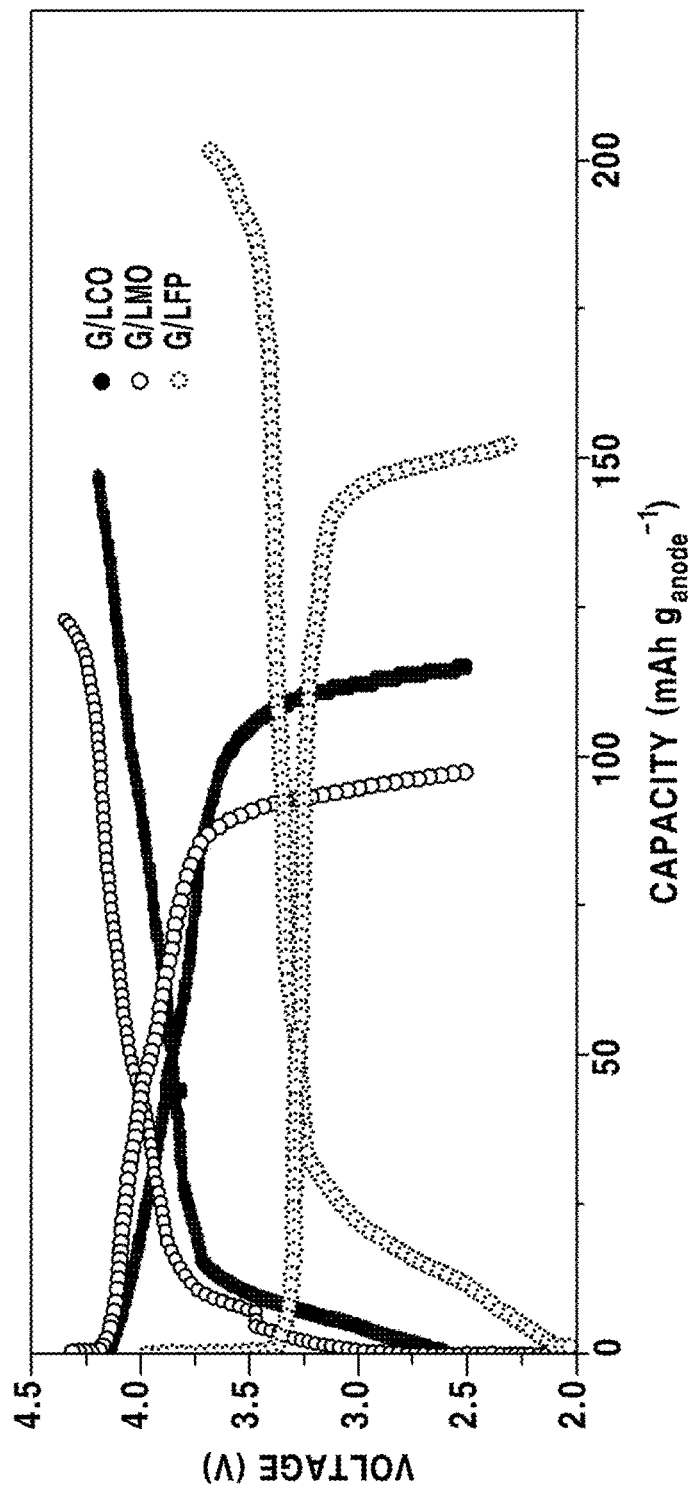
FIG. 16 shows charge-discharge operation profiles of graphite based full-cells in accordance with an example of the present disclosure.
Figure 17:
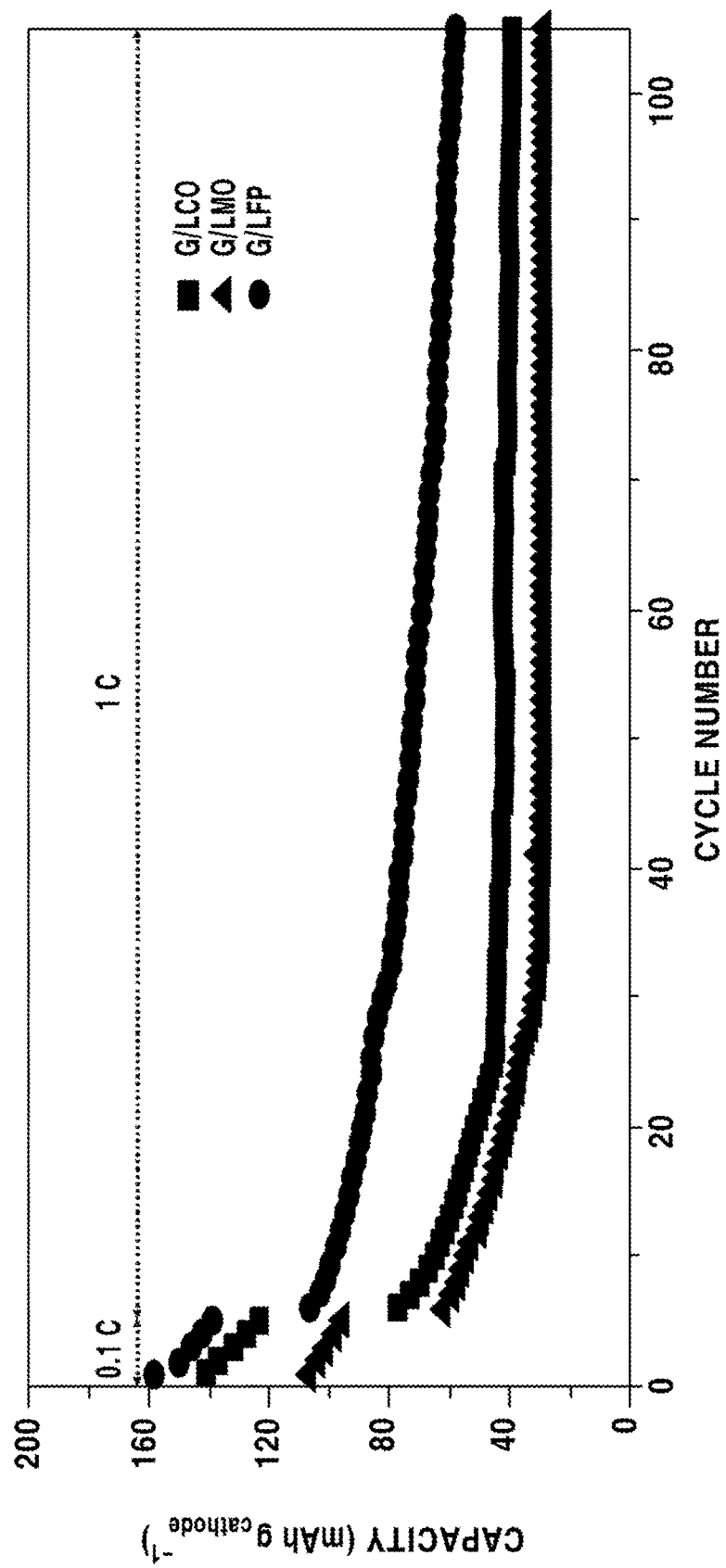
FIG. 17 shows the result of analysis of cycle performances of graphite based full-cells in accordance with an example of the present disclosure.
Figure 18:
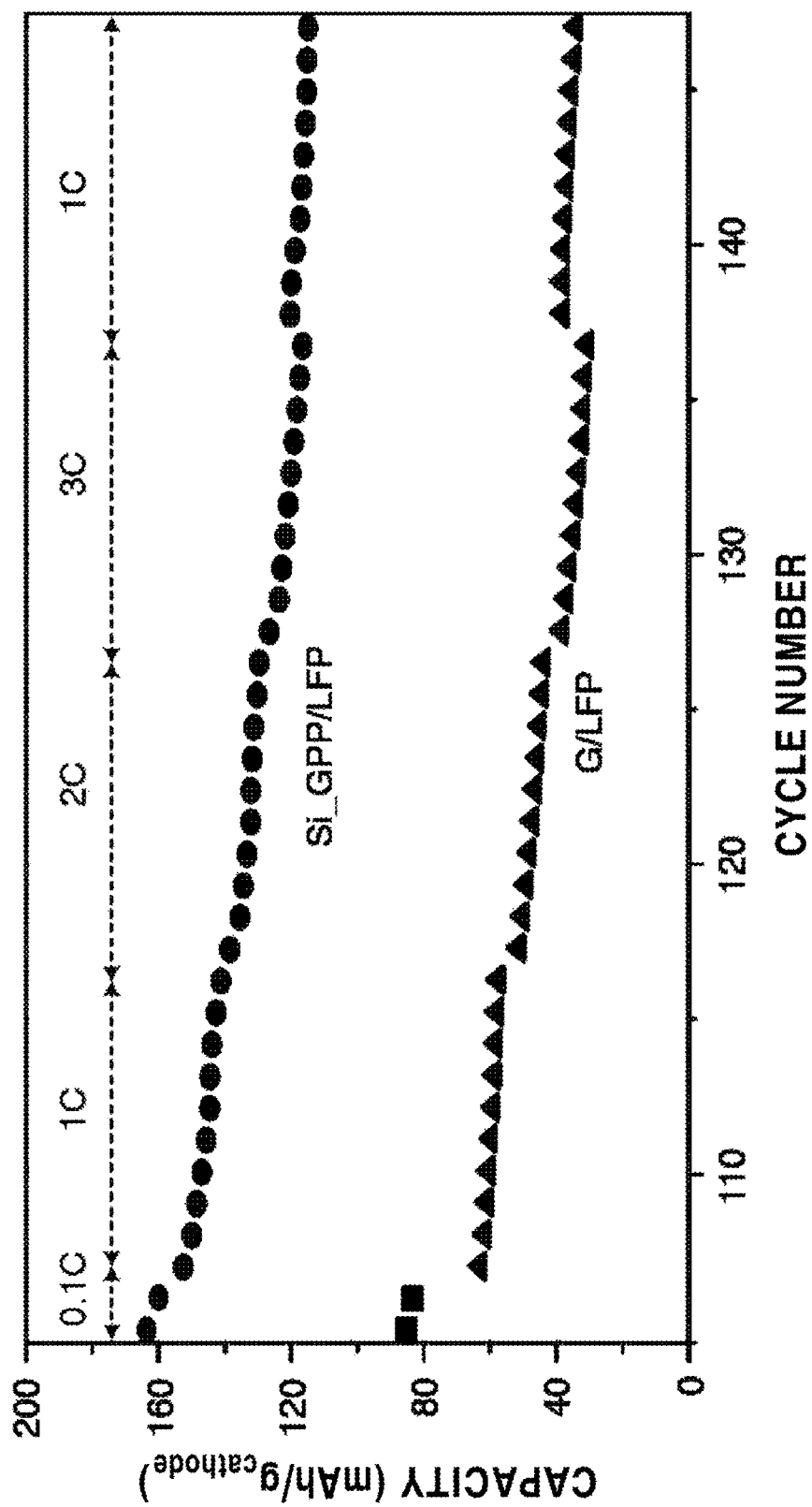
FIG. 18 is a graph showing comparison of charge/discharge rate capability of Si_GPP/LFP and G/LFP full-cell configurations after cycle performances in accordance with an example of the present disclosure.

The discharge capacities of 134.0, 100.2, and 162.1 mAh/g$_{cathode}$ at the first cycle were comparable to the capacities of full-cell with commercial graphite (FIG. 16), indicating the Li ions from cathodes were not consumed by the irreversible reactions during operations. The first CE of full-cells at 0.1 C rate were 86.86% (with LCO), 93.07% (with LMO), and 94.55% (with LFP) and reached up to 99.75% during the cycle retention at 1 C rate (FIG. 5D). During over 100 cycles at 1 C rate, the capacity of the Si_GPP based full-cells were preserved as 86.99% (with LCO), 78.46% (with LMO), and 95.52% (with LFP) of cycle retentions at 1 C rate, while the full-cells with graphite (G/LFP) showed around 56.67% of capacity retention after 100 cycles (FIG. 17). This result indicates that the stable cycle properties of the Si_GPP electrodes contribute to such a good cycle retention of full-cells with representative cathodes. Since the configurations with the LFP show the highest capacity among the samples, the rate capability of the Si_GPP/LFP and G/LFP was evaluated at various C rates of from 0.1 C rate to 3 C rate (FIG. 18). Si_GPP/LFP showed only 24% of capacity degradation at 3 C rate comparing to the capacity at 0.1 C rate. Comparing to the G/LFP, the Si_GPP/LFP showed a higher rate capability than G/LFP, indicating high performances of Si_GPP at high current densities improve the overall properties of full-cell configurations (FIG. 18).

Figure 5E:
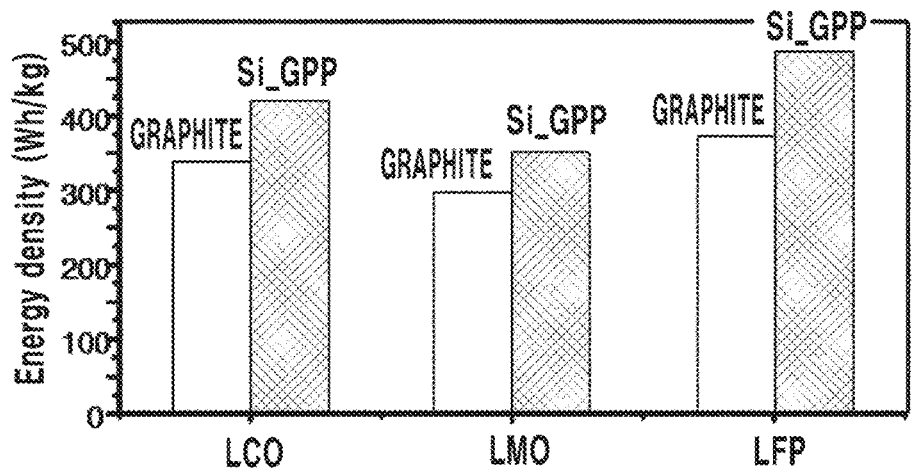
FIG. 5E is a graph showing comparison of energy densities of full-cells using Si_GPP and graphite with functions of cathode materials.

The high performances of anode materials can play an important role to enhance the energy density of full-cells by reducing the weight of the full-cell integration originating from the highly enlarged gravimetric capacities of anodes. The energy densities of full-cells were calculated from energy density=(Capacity$_{anode}$×Capacity$_{cathode}$)/(Capacity$_{anode}$+Capacity$_{cathode}$), ×Nominal potential. To avoid a confusion in comparison of the energy density across the different battery systems, only the weights of active materials were taken into account in the present Example. On the basis of full-cell performances, the experimental energy densities of conventional graphite/cathode systems were 293.6 Wh/kg (with LCO), 283.2 Wh/kg (with LMO), and 348.8 Wh/kg (with LFP), respectively, as presented in FIG. 5E. By the advantages in the capacity of anodes, the energy densities of full-cells with Si_GPP anodes were demonstrated as 448.1 Wh/kg (with LCO), 351.5 Wh/kg (with LMO), and 489.3 Wh/kg (with LFP) (FIG. 5E). Through the overall candidates of cathodes, remarkably, the full-cell integration with Si_GPP anodes showed the enhanced energy densities up to 68% higher than that of full-cells with the commercial graphite. It is notable that the high performances of Si_GPP electrodes can be a promising candidate to replace the present anodes for the full-cell devices having a high energy density with various compatible cathodes. Moreover, there is still room for improvement in the energy density of Si_GPP based full-cells by combining the other high capacity cathodes such as Li—[Co$_{1/3}$Ni$_{1/3}$Mn$_{1/3}$]O$_2$ (NMC), and Li[Ni$_{0.8}$Co$_{0.15}$Al$_{0.05}$]O$_2$ (NCA).

The present Example demonstrated that the Si_GPPs can be fabricated by the scalable process using an instant polymerization of ECA in commercial "Super glue". The dynamic (in a few seconds) reaction of ECA offers the new methodology to satisfy not only the well-controlled micro-sized structure, also the massive production. The Si nanoparticles were uniformly encapsulated in the GPP structure with a thin inner layer graphene giving the conductivity and a thick outer carbon pocket stabilizing the SEI layers during the operation, leading remarkable performances in a high capacity, rate capability, and good cycle retention. The robust performances of full-cells configured with representative commercial cathodes were observed with enhanced energy densities of up to 68% comparing to commercial graphite based full-cells.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

Explanation of Reference Numerals

100: Pliable carbonaceous pocket composite structure
110: First carbonaceous sheet
120: Second carbonaceous sheet
130: Particle
200: First carbonaceous pocket

We claim:

1. A pliable carbonaceous pocket composite structure, comprising a composite which includes:
   one or more particles wherein the one or more particles include an electrode material; and
   a plurality of first carbonaceous pockets formed by a first carbonaceous sheet and a second carbonaceous sheet facing each other, each of the particles being encapsulated by the first carbonaceous pocket, wherein the first carbonaceous sheet and the second carbonaceous sheet facing each other contact with each other in a first one or more regions, wherein the first carbonaceous sheet and the second carbonaceous sheet facing each other do not contact with each other in a second plurality of regions, wherein each of the second plurality of regions in which the first carbonaceous sheet and the second carbonaceous sheet do not contact with each other forms the first carbonaceous pockets, and wherein the plurality of the first carbonaceous pockets are formed apart from each other.

2. The pliable carbonaceous pocket composite structure of claim 1, wherein the first carbonaceous pocket include a closed type pocket, in which the first carbonaceous pocket wholly wraps the surface of the particle encapsulated therein.

3. The pliable carbonaceous pocket composite structure of claim 1, wherein each of the first carbonaceous sheet and the second carbonaceous sheet has wrinkles.

4. The pliable carbonaceous pocket composite structure of claim 1, wherein each of the first carbonaceous sheet and the second carbonaceous sheet independently comprises a sheet including graphene, graphite, carbon nanotube, carbon fiber, carbon black, activated carbon, graphene oxide(GO), or reduced graphene oxide(rGO).

5. The pliable carbonaceous pocket composite structure of claim 1, wherein two or more of the composite contact to each other by mutual contact of the first carbonaceous pockets included in each of the composites.

6. The pliable carbonaceous pocket composite structure of claim 1, further comprising:

a second carbonaceous pocket encapsulating one or more of the composite.

7. The pliable carbonaceous pocket composite structure of claim 6, wherein two or more of the pliable carbonaceous pocket composite structures contact to each other by mutual contact of the second carbonaceous pockets included in each of the pliable carbonaceous pocket composite structures.

8. The pliable carbonaceous pocket composite structure of claim 6, having porosity.

9. The pliable carbonaceous pocket composite structure of claim 6, wherein the second carbonaceous pocket comprises a plurality of carbonaceous sheets.

10. The pliable carbonaceous pocket composite structure of claim 9, wherein the second carbonaceous pocket comprises a sheet containing graphene, graphite, carbon nanotube, carbon fiber, carbon black, activated carbon, graphene oxide, or reduced graphene oxide.

11. The pliable carbonaceous pocket composite structure of claim 1, wherein the one or more particles have semiconductive, conductive, or insulating property.

12. The pliable carbonaceous pocket composite structure of claim 1, wherein the one or more particles comprise one or more elements selected from the group consisting of Si, Ge, Sn, Cd, Sb, Pb, Bi, Zn, Al, Co, Ni, Ti, Te, Mn, Fe, W, Ag, Au, Pt, V, Cu, Ga, P, and S.

13. The pliable carbonaceous pocket composite structure of claim 1, wherein the one or more particles have a nanometer-size.

14. The pliable carbonaceous pocket composite structure of claim 1, wherein a weight ratio of the carbonaceous sheets to the one or more particles is 1:0.001 or more.

15. The pliable carbonaceous pocket composite structure of claim 1, wherein the pliable carbonaceous pocket composite structure has dispersive property in a solvent.

16. An electrode, comprising the pliable carbonaceous pocket composite structure of claim 1.

17. The electrode of claim 16, wherein the electrode is used as an anode or cathode in an energy storage device.

18. An energy storage device, comprising the electrode of claim 16.

19. The energy storage device of claim 18, wherein the electrode is used as an anode or cathode in the energy storage device.

20. The energy storage device of claim 19, wherein the one or more particles comprise one or more elements selected from the group consisting of Si, Ge, Sn, Cd, Sb, Pb, Bi, Zn, Al, Co, Ni, Ti, Te, Mn, Fe, W, Ag, Au, Pt, V, Cu, Ga, and P when the electrode is used as an anode.

21. The energy storage device of claim 19, wherein the one or more particles comprise S when the electrode is used as cathode.

22. The energy storage device of claim 18, wherein the energy storage device is a battery, a capacitor, or a battery-capacitor hybrid.

23. The energy storage device of claim 18, wherein the energy storage device is Li-ion battery, Na-ion battery, Li-air battery, Na-air battery, Li-metal battery, Na-metal battery, Li-ion hybrid capacitor, or Na-ion hybrid capacitor.

24. A method for preparing the pliable carbonaceous pocket composite structure of claim 1, comprising:

a) forming a layered composite comprising one or more particles, a polymer, and carbonaceous sheets, wherein each of the one or more particles is located between a first carbonaceous sheet and a second carbonaceous sheet facing each other and each of the particles is—bonded to each of the first carbonaceous sheet and the second carbonaceous sheet by the polymer in the layered composite; and b) removing the polymer from the layered composite to obtain the pliable carbonaceous pocket composite structure which includes the one or more particles, each of the particles being encapsulated by each of the one or more first carbonaceous pockets formed by the first carbonaceous sheet and the second carbonaceous sheet facing each other.

25. The method for preparing a pliable carbonaceous pocket composite structure of claim 24, wherein the polymer in the step (a) is formed by a process which includes adding a monomer for forming the polymer to a solution including the carbonaceous sheets in a solvent and the particles to polymerize so that each of the particles is bonded to each of the first carbonaceous sheet and the second carbonaceous sheet by the polymer.

26. The method for preparing a pliable carbonaceous pocket composite structure of claim 24, wherein the step (b) further includes pulverizing the layered composite prior to removing the polymer so as to form a particulate of the layered composite, and then removing the polymer from the particulate so as to form a second carbonaceous pocket encapsulating one or more of the composites.

27. The method for preparing a pliable carbonaceous pocket composite structure of claim 25, wherein the monomer for forming the polymer in the step (a) comprises an anionic polymerizable monomer.

28. The method for preparing a pliable carbonaceous pocket composite structure of claim 27, wherein the monomer for forming the polymer comprises a $C_{1-10}$ alkyl cyanoacrylate.

29. The method for preparing a pliable carbonaceous pocket composite structure of claim 25, wherein the solvent in the step (a) is evaporated and removed by heat from the polymerization reaction of the monomer for forming the polymer, or removed after the polymerization reaction, so as to form pores in the composite.

30. The method for preparing a pliable carbonaceous pocket composite structure of claim 29, wherein the solvent has a boiling point of 100° C. or less.

31. The method for preparing a pliable carbonaceous pocket composite structure of claim 26, wherein the pulverizing of the layered composite is performed by ball-milling, grinding, mixing, or sieving.

32. The method for preparing a pliable carbonaceous pocket composite structure of claim 26, wherein the particulate of the layered composite obtained by the pulverizing in the step (b) has a size of micrometer or more.

33. The method for preparing a pliable carbonaceous pocket composite structure of claim 26, further comprising:
removing the particles which are not encapsulated and present at an exterior surface of the particulate, prior to removing the polymer from the particulate obtained by pulverizing the layered composite.

34. The method for preparing a pliable carbonaceous pocket composite structure of claim 24,
wherein the first carbonaceous sheet and the second carbonaceous sheet facing each other contact to each other in one or more regions, and
wherein each of one or more regions in which the first carbonaceous sheet and the second carbonaceous sheet do not contact to each other forms the first carbonaceous pocket.

35. The method for preparing a pliable carbonaceous pocket composite structure of claim 24, wherein each of the first carbonaceous sheet and the second carbonaceous sheet has wrinkles.

36. The method for preparing a pliable carbonaceous pocket composite structure of claim 24, wherein each of the first carbonaceous sheet and the second carbonaceous sheet independently comprises a sheet containing graphene, graphite, carbon nanotube, carbon fiber, carbon black, activated carbon, graphene oxide, or reduced graphene oxide.

37. The method for preparing a pliable carbonaceous pocket composite structure of claim 24, wherein the one or more particles have semiconductive, conductive, or insulating property.

38. The method for preparing a pliable carbonaceous pocket composite structure of claim 24, wherein the one or more particles include an electrode material.

39. The method for preparing a pliable carbonaceous pocket composite structure of claim 24, wherein the one or more particles include one or more elements selected from the group consisting of Si, Ge, Sn, Cd, Sb, Pb, Bi, Zn, Al, Co, Ni, Ti, Te, Mn, Fe, W, Ag, Au, Pt, V, Cu, Ga, P, and S.

40. The method for preparing a pliable carbonaceous pocket composite structure of claim 24, wherein the one or more particles have a nanometer-size.

41. The method of claim 24, wherein the weight ratio of the carbonaceous sheets to the one or more particles is 1:0.001 or more.

* * * * *